(12) United States Patent
Bhargava et al.

(10) Patent No.: US 11,428,628 B2
(45) Date of Patent: Aug. 30, 2022

(54) METHOD AND APPARATUS FOR MULTI-COLOR DISCRETE FREQUENCY INFRARED SPECTROSCOPIC IMAGING

(71) Applicant: The Board of Trustees of the University of Illinois, Urbana, IL (US)

(72) Inventors: Rohit Bhargava, Urbana, IL (US); Kevin Lee Yeh, Corvallis, OR (US)

(73) Assignee: THE BOARD OF TRUSTEES OF THE UNIVERSITY OF ILLINOIS, Urbana, IL (US)

(*) Notice: Subject to any disclaimer, the term of this patent is extended or adjusted under 35 U.S.C. 154(b) by 0 days.

(21) Appl. No.: 17/135,010

(22) Filed: Dec. 28, 2020

(65) Prior Publication Data

US 2021/0208064 A1    Jul. 8, 2021

Related U.S. Application Data

(60) Provisional application No. 62/956,784, filed on Jan. 3, 2020.

(51) Int. Cl.
*G01J 5/02*     (2022.01)
*G01N 21/3563*  (2014.01)
(Continued)

(52) U.S. Cl.
CPC ............ *G01N 21/3563* (2013.01); *G01J 3/02* (2013.01); *G01J 3/2823* (2013.01); *G01N 21/35* (2013.01);
(Continued)

(58) Field of Classification Search
CPC .............. G01N 21/3563; G01N 21/35; G01N 2201/0636; G01N 2201/06113;
(Continued)

(56) References Cited

U.S. PATENT DOCUMENTS 7,012,695 B2    3/2006  Maier et al.
7,768,647 B2    8/2010  Reeve et al.
(Continued)

OTHER PUBLICATIONS

Yeh et al., "Multicolor discrete frequency infrared spectroscopic imaging," 2019, Analytical Chemistry, vol. 91, pp. 2177-2185. (Year: 2019).*

(Continued)

*Primary Examiner* — Kiho Kim
(74) *Attorney, Agent, or Firm* — Crowell & Moring LLP

(57) ABSTRACT

The disclosure is directed to methods and apparatus for obtaining a discrete frequency infrared (DFIR) spectroscopic image. The method includes generating, by a laser source, a pulsed laser beam comprising a spectral frequency in a mid-IR region and a pulse repetition rate; transmitting, by a first group of optical components, the pulsed laser beam onto a location of a sample; collecting, by a second group of optical components, an optical signal emitting from the location of the sample onto a detector to obtain a raw electric signal; demodulating, by a demodulator based on the pulse repetition rate, the raw electric signal to obtain an intensity value; and determining, by a control device and based on the intensity value, a pixel value corresponding to the spectral frequency in a DFIR spectroscopic image.

20 Claims, 19 Drawing Sheets

(51) Int. Cl.
G01N 21/35 (2014.01)
G01J 3/02 (2006.01)
G01J 3/28 (2006.01)

(52) U.S. Cl.
CPC ............... G01N 2201/0636 (2013.01); G01N 2201/06113 (2013.01)

(58) Field of Classification Search
CPC .......... G01N 21/39; G01J 3/02; G01J 3/2823; G01J 3/433
See application file for complete search history.

(56) References Cited

U.S. PATENT DOCUMENTS

| 8,593,630 | B2 | 11/2013 | Bhargava et al. | |
|---|---|---|---|---|
| 9,329,085 | B2 | 5/2016 | Kotidis et al. | |
| 2019/0120753 | A1* | 4/2019 | Prater | G01N 23/207 |

OTHER PUBLICATIONS

Bhargava, R., "Infrared Spectroscopic Imaging: The next Generation," Appl. Spectrosc. 2012, 66 (10), pp. 1091-1120.
Wrobel, T. P. et al., "Emerging Trends and Opportunities in Discrete Frequency Infrared and Raman Spectroscopic Imaging," Spectroscopy 2016, 31 (6), pp. 28-44.
Wrobel, T. P. et al., "Infrared Spectroscopic Imaging Advances as an Analytical Technology for Biomedical Sciences," Anal. Chem. 2018, 90 (3), pp. 1444-1463.
Davis, B. J. et al., "Theory of Mid-infrared Absorption Microspectroscopy: I. Homogeneous Samples," Anal. Chem. 2010, 82 (9), pp. 3474-3486.
Davis, B. J. et al., "Theory of Mid-Infrared Absorption Microspectroscopy: II. Heterogeneous Samples," Anal. Chem. 2010, 82 (9), pp. 3487-3499.
Baker, M. J. et al., "Using Fourier Transform IR Spectroscopy to Analyze Biological Materials," Nat. Protoc. 2014, 9 (8), pp. 1771-1791.
Bhargava, R. et al., "FTIR Microspectroscopy of Polymeric Systems," Adv. Polym. Sci. 2003, 163, pp. 137-191.
Tiwari, S. et al., "Computational Chemical Imaging for Cardiovascular Pathology: Chemical Microscopic Imaging Accurately Determines Cardiac Transplant Rejection," PLoS One 2015, 10 (5), pp. 1-15.
Bhargava, R.et al., "High Throughput Assessment of Cells and Tissues: Bayesian Classification of Spectral Metrics from Infrared Vibrational Spectroscopic Imaging Data. Biochim," Biophys. Acta 2006, 1758 (7), pp. 830-845.
Guo, B. et al., "Using Semiconductor Lasers," 2003, 57 (7), pp. 811-822.
Kole, M. R. et al., "Discrete Frequency Infrared Microspectroscopy and Imaging with a Tunable Quantum Cascade Laser," Anal. Chem. 2012, 84 (23), pp. 10366-10372.
Bassan, P. et al., "Large Scale Infrared Imaging of Tissue Micro Arrays (TMAs) Using a Tunable Quantum Cascade Laser (QCL) Based Microscope," Analyst 2014, 139 (16), pp. 3856-3859.
Yeh, K . . . et al., "Fast Infrared Chemical Imaging with a Quantum Cascade Laser," Anal. Chem. 2015, 87 (1), pp. 485-493.
Kröger, N.; Egl et al., "Quantum Cascade Laser-based Hyperspectral Imaging of Biological Tissue," J. Biomed. Opt. 2014, 19 (11), 111607, 7 pp.
Kuepper, C. et al., "Quantum Cascade Laser-Based Infrared Microscopy for Label-Free and Automated Cancer Classification in Tissue Sections," Sci. Rep. 2018, 8 (1), pp. 1-10.
Bassan, P. et al., "FTIR Microscopy of Biological Cells and Tissue: Data Analysis Using Resonant Mie Scattering (RMieS) EMSC Algorithm," Analyst 2012, 137 (6), pp. 1370-1377.
Bambery, K. R. et al., "Resonant Mie Scattering (RMieS) Correction Applied to FTIR Images of Biological Tissue Samples," Analyst 2012, 137 (1), pp. 126-132.
Schönhals, A. et al., "On the Role of Interference in Laser-Based Mid-Infrared Widefield Microspectroscopy," Biophotonics 2018, e201800015, 7 pp.
Ran, S. et al., "Mitigating Fringing in Discrete Frequency Infrared Imaging Using Time-Delayed Integration," Biomed. Opt. Express 2018, 9 (2), 832, 12 pp.
Yeh, K. et al., "Discrete Frequency Infrared Imaging Using Quantum Cascade Lasers for Biological Tissue Analysis," In SPIE; Mahadevan-Jansen, A., Petrich, W., Eds.; 2016; vol. 9704, p. 970406, 8 pp.
Mittal, S. et al., "Simultaneous Cancer and Tumor Microenvironment Subtyping Using Confocal Infrared Microscopy for All-Digital Molecular Histopathology," Proc. Natl. Acad. Sci. 2018, 115 (25), pp. E5651-E5660, 10 pp.
Tiwari, S. et al., "Towards Translation of Discrete Frequency Infrared Spectroscopic Imaging for Digital Histopathology of Clinical Biopsy Samples," Anal. Chem. 2016, 88 (20), pp. 10183-10190.
Lu, F. et al., "Tip-Enhanced Infrared Nanospectroscopy via Molecular Expansion Force Detection," Nat. Photonics 2014, 8 (4), pp. 307-312.
Kenkel, S. et al., "Probe-Sample Interaction-Independent Atomic Force Microscopy-Infrared Spectroscopy: Toward Robust Nanoscale Compositional Mapping," Anal. Chem. 2018, 90 (15), pp. 8845-8855.
Dazzi, A. et al., "Theory of Infrared Nanospectroscopy by Photothermal Induced Resonance," J. Appl. Phys. 2010, 8 pp.
Ramer, G. et al., "A. Quantitative Chemical Analysis at the Nanoscale Using the Photothermal Induced Resonance Technique," Anal. Chem. 2017, 89 (24), pp. 13524-13531.
Pleitez, M. A. et al., "In Vivo Noninvasive Monitoring of Glucose Concentration in Human Epidermis by Mid-Infrared Pulsed Photoacoustic Spectroscopy," Anal. Chem. 2013, 85 (2), 1013-1020.
Zhang, D. et al., "Depth-Resolved Mid-Infrared Photothermal Imaging of Living Cells and Organisms with Submicrometer Spatial Resolution," Sci. Adv. 2016, 2 (9), pp. 1-8.
Berer, T. et al., "Remote Mid-Infrared Photoacoustic Spectroscopy with a Quantum Cascade Laser," Opt. Lett. 2015, 40 (15), pp. 3476-3479.
Tiwari, S. et al., "Translation of Infrared Chemical Imaging for Cardiovascular Evaluation," Prog. Biomed. Opt.2 Imaging—Proc. SPIE 2016, 9704, 11 pp.
Griffiths, P., de Haseth, J. A., Fourier Transform Infrared Spectrometry, 2nd Ed.; John Wiley & Sons: Hoboken, NJ, 2007.
Bhargava, R. et al., "Comparison of the FT-IR Mapping and Imaging Techniques Applied to Polymeric Systems," Appl. Spectrosc. 2000, 54 (4), pp. 470-479.
Lambrechts, P. et al., "Trajectory Planning and Feedforward Design for Electromechanical Motion Systems," Control Eng. Pract. 2005, 13 (2), pp. 145-157.
Mayerich, D. et al., "On the Importance of Image Formation Optics in the Design of Infrared Spectroscopic Imaging Systems," Analyst 2014, 139 (16), pp. 4031-4036.
Jágerská, J. et al., "Multi-Color Laser Spectroscopy with a Dual-Wavelength Quantum Cascade Laser," 2014, No. 2, pp. 3-4.
Jouy, P. et al., "Multi-Wavelength QCL Based MIR Spectroscopy for Fluids and Gases," 2013 Conf. Lasers Electro-Optics 2013, 2 pp.
Gmachl, C. et al., "A. Y. Quantum Cascade Lasers with a Heterogeneous Cascade: Two-Wavelength Operation," Appl. Phys. Lett. 2001, 79 (5), pp. 572-574.
Rauter, P. et al., Multi-Wavelength Quantum Cascade Laser Arrays. Laser Photonics Rev. 2015, 9 (5), pp. 452-477.

* cited by examiner

210

```
generating, by a first laser source, a first pulsed laser beam comprising a first
spectral frequency in a mid-IR region and a first pulse repetition rate;
                                                                         212
```

```
transmitting, by a first group of optical components, the first pulsed laser beam onto a
first location of a sample;
                                                                                 214
```

```
collecting, by a second group of optical components, first optical signal emitting from
the first location of the sample onto a detector to obtain first raw electric signal;
                                                                                    216
```

```
demodulating, by a first demodulator based on the first pulse repetition rate, the first
raw electric signal to obtain a first intensity value corresponding to the first location of
the sample;                                                                           218
```

```
determining, by a control device comprising a memory storing instructions and a
processor in communication with the memory and based on the first intensity value, a
first pixel value corresponding to the first spectral frequency in a DFIR spectroscopic
image corresponding to the first location of the sample.                          220
```

FIG. 2A generating, by a second laser source, a second pulsed laser beam comprising a second spectral frequency in the mid-IR region and the first pulse repetition rate;
232 transmitting, by the first group of optical components, the second pulsed laser beam onto the first location of a sample;
234 collecting, by the second group of optical components, second optical signal emitting from the first location of the sample onto the detector to obtain second raw electric signal;
236 demodulating, by the first demodulator based on the first pulse repetition rate, the second raw electric signal to obtain a second intensity value corresponding to the first location of the sample;
238 determining, by the control device and based on the second intensity value, a second pixel value corresponding to the second spectral frequency in the DFIR spectroscopic image corresponding to the first location of the sample, wherein the first spectral frequency and the second spectral frequency are different, and the first pulsed laser beam and the second pulsed laser beam are transmitted onto the first location of the sample in a sequential manner
240

FIG. 2B generating, by a second laser source, a second pulsed laser beam comprising a second spectral frequency in the mid-IR region and a second pulse repetition rate;
252 transmitting, by the first group of optical components, the second pulsed laser beam onto the first location of a sample;
254 collecting, by the second group of optical components, second optical signal emitting from the first location of the sample onto the detector to obtain second raw electric signal;
256 demodulating, by a second demodulator based on the second pulse repetition rate, the second raw electric signal to obtain a second intensity value corresponding to the first location of the sample;
258 determining, by the control device and based on the second intensity value, a second pixel value corresponding to the second spectral frequency in the DFIR spectroscopic image corresponding to the first location of the sample, wherein: the first spectral frequency and the second spectral frequency are different, the first pulse repetition rate and the second pulse repetition rate are different, and the first pulsed laser beam and the second pulsed laser beam are transmitted onto the first location of the sample simultaneously.
260

FIG. 2C generating, by one or more subsequent laser, in bursts wherein each laser of the one or more subsequent laser is delayed relative to the previous laser by at least 1 pulse width duration

272

separating, by a high-speed data acquisition device, individual lasers, wherein corresponding to each of the first burst, the first set of raw electric signals is used to obtain a first set of intensity values corresponding to the first location of the sample;

274

determining, by the control device and based on the first set of intensity values, a first set of pixel values corresponding to the first set of spectral frequencies in a DFIR spectroscopic image corresponding to the first location of the sample. In one implementation, the high-speed data acquisition device may include a high speed digitizer.

METHOD AND APPARATUS FOR MULTI-COLOR DISCRETE FREQUENCY INFRARED SPECTROSCOPIC IMAGING

RELATED APPLICATION

This application claims priority to Provisional Application No. 62/956,784, filed on Jan. 3, 2020, which is incorporated by reference in its entirety.

GOVERNMENT LICENSE RIGHTS

This invention was made with government support under Grant No. R01 EB009745 awarded by the National Institutes of Health. The government has certain rights in the invention.

BACKGROUND

1. Technical Field

The present disclosure relates to methods and apparatus for infrared microscopy imaging, and more particularly to multi-color discrete frequency infrared spectroscopic imaging.

2. Background Information

Infrared (IR) spectroscopic imaging has undergone several innovations in recent years that have advanced to be used as an analytical technique. IR spectroscopic imaging is a non-destructive approach that directly images the distribution of chemical composition of samples. Contrast is derived from molecular structures which absorb optical frequencies that are resonant with the vibrational modes of the comprised functional groups. Each peak in the absorption spectrum corresponds to a characteristic which together can be used for the identification and classification of spatially- and spectrally-complex samples. While IR vibrational frequencies span the mid-IR spectral range (for example, a wavenumber range of 800-4000 $cm^{-1}$), the fingerprint region (for example, a wavenumber range of 800-1800 $cm^{-1}$) has traditionally been critical for biological and polymeric sample identifications.

There are some problems/issues with the existing methods and systems for performing IR spectroscopic imaging, for example but not limited to, low speed, low efficiency, time consuming, and/or poor image formation. The present disclosure describes various embodiments for performing multi-color discrete frequency infrared spectroscopic imaging, addressing one or more drawbacks, including but not limited to those problems/issues set forth above. The embodiments in the present disclosure may increase speed, provide better image formation, shorten image acquisition time, and/or improve efficiency, so as to improve technologies of IR spectroscopic imaging.

BRIEF SUMMARY

The present disclosure is directed to various methods and apparatus for preforming multi-color discrete frequency infrared spectroscopic imaging to obtain a multi-color discrete frequency infrared spectroscopic image of a sample. A set of discrete frequency infrared spectroscopic images acquired sequentially is known as a multi-spectral image if the number of bands is small and possibly with non-uniform spacing, otherwise this set is known as a hyperspectral image. Multi-color discrete frequency images are multi-spectral images that have been acquired effectively in parallel and with a common detector.

The present disclosure describes a method for obtaining a discrete frequency infrared (DFIR) spectroscopic image for a sample. The method includes generating, by a first laser source, a first pulsed laser beam comprising a first spectral frequency in a mid-IR region and a first pulse repetition rate; transmitting, by a first group of optical components, the first pulsed laser beam onto a first location of a sample; and collecting, by a second not necessarily unique group of optical components, first optical signal emitting from the first location of the sample onto a detector to obtain first raw electric signal. The method also includes demodulating, by a first demodulator based on the first pulse repetition rate, the first raw electric signal to obtain a first intensity value corresponding to the first location of the sample; and determining, by a control device comprising a memory storing instructions and a processor in communication with the memory and based on the first intensity value, a first pixel value corresponding to the first spectral frequency in a DFIR spectroscopic image corresponding to the first location of the sample.

The present disclosure describes an apparatus for obtaining a discrete frequency infrared (DFIR) spectroscopic image for a sample. The apparatus includes a first laser source configured to generate a first pulsed laser beam comprising a first spectral frequency in a mid-IR region and a first pulse repetition rate; a first group of optical components configured to transmit the first pulsed laser beam onto a first location of a sample; a second not necessarily unique group of optical components configured to collect first optical signal emitting from the first location of the sample onto a detector to obtain first raw electric signal; a first demodulator configured to demodulate, based on the first pulse repetition rate, the first raw electric signal to obtain a first intensity value corresponding to the first location of the sample; and a control device configured to determine, based on the first intensity value, a first pixel value corresponding to the first spectral frequency in a DFIR spectroscopic image corresponding to the first location of the sample.

The present disclosure describes a method for obtaining a discrete frequency infrared (DFIR) spectroscopic image for a sample. The method includes generating, by a first laser source, a first pulsed laser beam comprising a first spectral frequency in a mid-IR region and a first pulse repetition rate; transmitting, by a first group of optical components, the first pulsed laser beam onto a first location of a sample; and collecting, by a second not necessarily unique group of optical components, first optical signal emitting from the first location of the sample onto a detector to obtain first raw electric signal. The method also includes subsequent lasers, firing in bursts where each laser is delayed relative to the previous laser by at least 1 pulse width duration. The individual lasers are separable in by high speed data acquisition, where each the first burst, the first set of raw electric signals is used to obtain a first set of intensity values corresponding to the first location of the sample; and determining, by a control device comprising a memory storing instructions and a processor in communication with the memory and based on the first set of intensity values, a first set of pixel values corresponding to the first set of spectral frequencies in a DFIR spectroscopic image corresponding to the first location of the sample.

The present disclosure describes another apparatus for obtaining a discrete frequency infrared (DFIR) spectroscopic image for a sample. The apparatus includes a first laser source configured to generate a first pulsed laser beam comprising a first spectral frequency in a mid-IR region and a first pulse repetition rate; a first group of optical components configured to transmit the first pulsed laser beam onto a first location of a sample; a second group of optical components configured to measure the perturbation induced in the sample by the first laser source, by means of secondary optical, acoustic, and/or mechanical sensors to obtain the first raw electric signal; a first demodulator configured to demodulate, based on the first pulse repetition rate, the first raw electric signal to obtain a first intensity value corresponding to the first location of the sample; and a control device configured to determine, based on the first intensity value, a first pixel value corresponding to the first spectral frequency in a DFIR spectroscopic image corresponding to the first location of the sample.

The above and other aspects and their implementations are described in details in the drawings, the descriptions, and the claims.

BRIEF DESCRIPTION OF THE DRAWINGS

The system, device, product, and/or method described below may be better understood with reference to the following drawings and description of non-limiting and non-exhaustive embodiments. The components in the drawings are not necessarily to scale. Emphasis instead is placed upon illustrating the principles of the disclosure.

FIG. 2A shows a flow diagram of an embodiment of a method for performing discrete frequency infrared spectroscopic imaging.

FIG. 2B shows a flow diagram of another method for performing multi-color discrete frequency infrared spectroscopic imaging in a sequential manner.

FIG. 2C shows a flow diagram of another method for performing multi-color discrete frequency infrared spectroscopic imaging in a simultaneous manner.

FIG. 2D shows a flow diagram of another method for performing multi-color discrete frequency infrared spectroscopic imaging in a simultaneous manner.

Figure 1A:
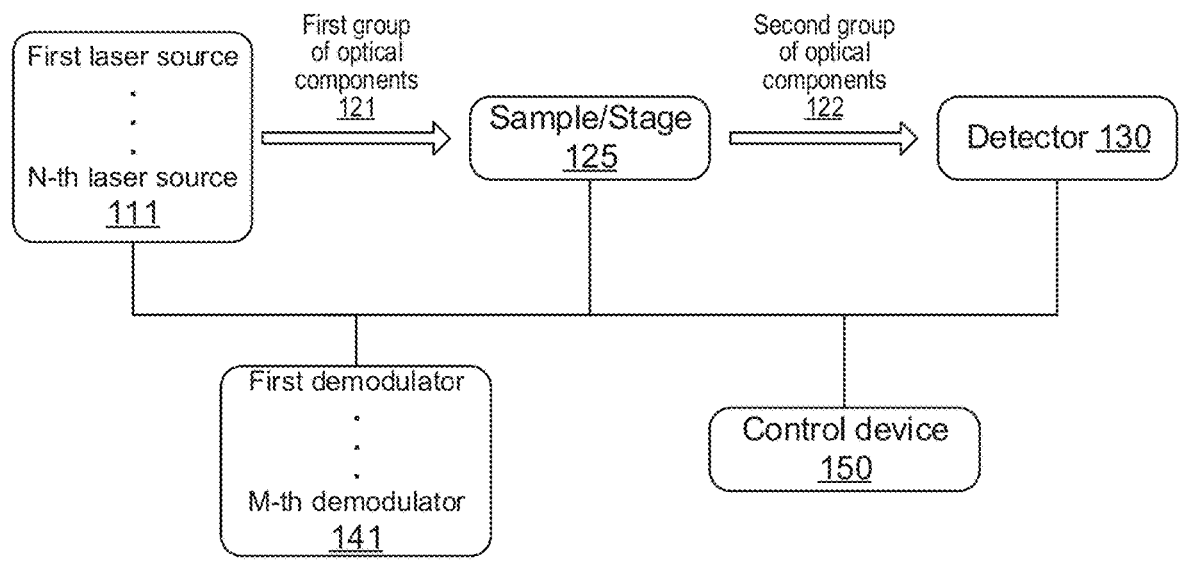
FIG. 1A shows a schematic diagram of an embodiment of an apparatus for performing discrete frequency infrared spectroscopic imaging. The embodiment may include N lasers and M demodulators, wherein N≥1 and M≥1. If N>M, only M lasers can be demodulated simultaneously, and each group of M lasers may be enabled sequentially as shown in FIG. 1B. If N≤M, all the lasers may be demodulated simultaneously as show in FIG. 1C.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

DETAILED DESCRIPTION OF THE DISCLOSURE

The disclosed systems and methods will now be described in detail hereinafter with reference to the accompanied drawings, which form a part of the present application, and which show, by way of illustration, specific examples of embodiments. Please note that the systems and methods may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosed system and methods may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. It is intended, for example, that claimed subject matter may include combinations of exemplary embodiments in whole or in part. Moreover, the phrase "in one implementation", "in another implementation", or "in some implementations" as used herein does not necessarily refer to the same implementation or different implementation. It is intended, for example, that claimed subject matter may include combinations of the disclosed features from the implementations in whole or in part.

In general, terminology may be understood at least in part from usage in context. For example, terms, such as "and", "or", or "and/or," as used herein may include a variety of meanings that may depend at least in part upon the context in which such terms are used. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes various embodiments for performing discrete frequency infrared (IR) spectroscopic imaging, addressing one or more drawbacks existing with the previous systems/methods. The present disclosure may increase speed, provide better image formation, save image acquisition time, and/or improve efficiency, so as to improve technologies of IR spectroscopic imaging.

The present disclosure describes advancement of discrete frequency infrared (DFIR) spectroscopic microscopes in image quality and data throughput, which may be important to their use for analytical measurements. Various embodiments in the present disclosure describe development and characterization of a point scanning instrument with minimal aberrations and capable of diffraction-limited performance across all fingerprint region wavelengths over arbitrarily large samples. The performance of various embodiments in the present disclosure are compared to commercial state of the art Fourier transform infrared (FT-IR) imaging systems. For large samples or smaller set of discrete frequencies, the present disclosure describes that point scanning may far exceed (for example, 10-100 fold) comparable data acquired with FT-IR instruments.

The present disclosure also describes improvements in image quality using refractive lenses and significantly improved contrast across the spatial frequency bandwidth. The present disclosure further describes the ability to image multiple tunable frequencies simultaneously using a single detector by means of demodulation and/or multiplexing to further speed up data acquisition and reduce the impact of scattering. The various embodiments in the present disclosure may provide significantly better spectral quality and spatial fidelity than some existing imaging systems.

The IR vibrational frequencies may span the mid-IR spectral range (for example, in a wavenumber range of 800-4000 $cm^{-1}$). Among the mid-IR spectral range, the fingerprint region (for example, in a wavenumber range of 800-1800 $cm^{-1}$) may be critical for biological and/or polymeric sample identifications.

The acquisition of a limited spectral range may often be a feasible route to reduce data acquisition time while maintaining the analytical capabilities of IR spectroscopy and imaging. The ability to obtain actionable information about a sample may not require the measurement of the continuous spectral range, a restriction fundamental to traditional Fourier Transform (FT) technology, the historical state-of-the-art.

The present disclosure describes embodiments for discrete frequency infrared microscopy (DFIR) systems using a discrete subset of spectral positions. The discrete subset of spectral positions may include typically less than 30 bands, which may be sufficient for histopathological tissue imaging. The DFIR system may predominantly use quantum cascade lasers (QCL) with 50-fold gains in speed at present by only measuring the spectral frequencies required. Furthermore, with substantially higher source power and a narrower spectral range of lasers, refractive optics may be used for better image formation. The present disclosure describes designs of instruments under these conditions and how laser-based DFIR imaging may be enhanced even further in performance.

Figure 1B:
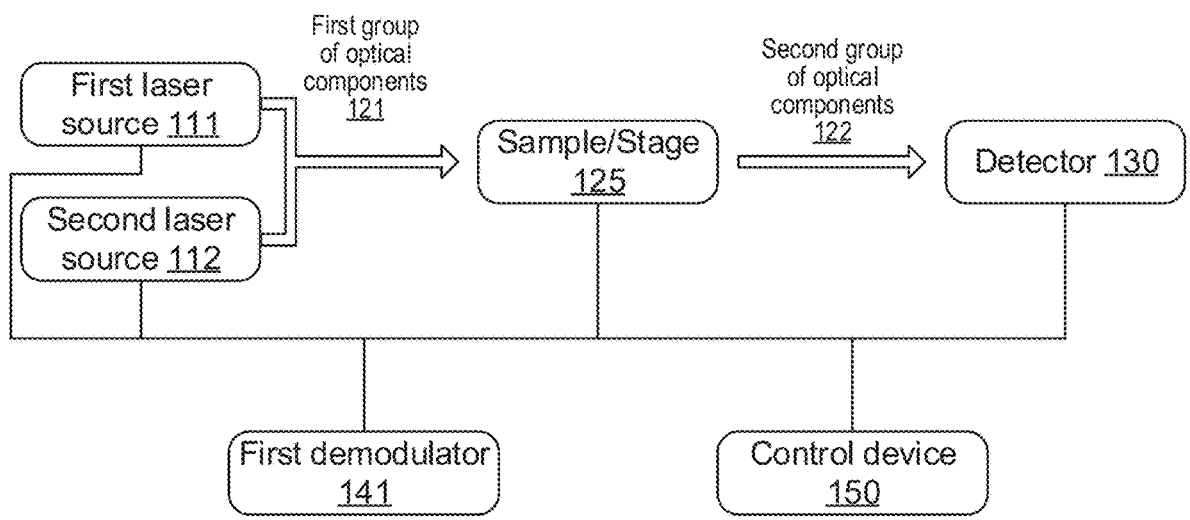
FIG. 1B shows a schematic diagram of another embodiment of an apparatus for performing multi-color discrete frequency infrared spectroscopic imaging in a sequential manner.

Referring to FIG. 1A, one embodiment includes an apparatus for performing discrete frequency infrared (DFIR) spectroscopic imaging. The apparatus may include a portion or all of the following: a first laser source 111, a first group of optical components 121, a sample and/or stage 125, a second group of optical components 122, a detector 130, a first demodulator 141, and/or a control device 150. In one implementation, the first group of optical components 121 and the second group of optical components 122 may share one or more common optical component, which is discussed below. In another implementation, the system may be expanded to N lasers and M demodulators, so that the first laser source 111 may include N laser sources, the demodulator 141 may include M demodulators, wherein N≥1 and M≥1. If N>M, only M lasers may be demodulated simultaneously, and each group of M lasers may be enabled sequentially as shown in FIG. 1B. If N≤M, all the lasers may be demodulated simultaneously as show in FIG. 1C.

FIG. 2A shows a flow diagram of a method 210 for performing DFIR spectroscopic imaging. The method 210 may include a portion or all of the following steps: step 212: generating, by a first laser source, a first pulsed laser beam comprising a first spectral frequency in a mid-IR region and a first pulse repetition rate; step 214: transmitting, by a first group of optical components, the first pulsed laser beam onto a first location of a sample; step 216: collecting, by a second group of optical components, first optical signal emitting from the first location of the sample onto a detector to obtain first raw electric signal; step 218: demodulating, by a first demodulator based on the first pulse repetition rate, the first raw electric signal to obtain a first intensity value corresponding to the first location of the sample; and step 220: determining, by a control device comprising a memory storing instructions and a processor in communication with the memory and based on the first intensity value, a first pixel value corresponding to the first spectral frequency in a DFIR spectroscopic image corresponding to the first location of the sample.

In step 212, the first laser source 111 in FIG. 1A may be a tunable or fixed laser source, and generate a first pulsed laser beam. The first pulsed laser beam may include a first spectral frequency in a mid-IR region and a first pulse repetition rate. In the present disclosure, "pulsed" may refer to a periodic variation of intensity or phase, and "pulsed laser beam" may refer to any laser not classified as continuous wave, so that the optical power appears in pulses of some duration at some repetition rate. It may arise by, for example but not limited to, modulation of a continuous wave laser, Q-switching, mode-locking, and/or pulsed pumping. In one implementation, the mid-IR region may include a wavelength range from 2 μm to 20 μm. In another implementation, the mid-IR region may refer to a molecular-fingerprint region, i.e., a mid-IR fingerprint region (for example, a wavenumber range of 800-1800 $cm^{-1}$), in which most molecules have intense fundamental vibrational bands. The IR spectrum of a given molecule thus provides a unique way to non-intrusively identify and quantify that molecule in any phase of matter.

In one implementation, the first laser source may refer to a single laser module have a spectral tuning range within the mid-IR fingerprint region. In another implementation, the first laser source may include more than one laser modules that together have a tuning range that spans the mid-IR fingerprint region. In another implementation, the first laser source may be a quantum cascade laser (QCL). In another implementation, the first laser source may be an optical parametric oscillator (OPO). In another implementation, the first laser source may be an interband cascade laser (ICL). In another implementation, the first laser source may be a quantum cascade multilaser source that contains four individual tuner modules with beams combined into a single collinear output spanning the mid-IR fingerprint region.

In another implementation, the first laser source 111 may receive instructions from the control device 150 to determine at least one of the followings: turning off/on the first laser source, its output spectral frequency, or its output repetition rate. In another implementation, the first laser source 111 may communicate with the first demodulator 141 regarding its pulse repetition rate, so that the first demodulator 141 may perform demodulation based on the pulse repetition rate of the first laser source.

In step 214, the first group of optical components 121 may transmit the first pulsed laser beam onto a first location of the sample 125. The first group of optical components may include at least one of the following: a mirror, a lens, an objective lens, a beam splitter, an aperture, or a grating. The one or more mirror may be controlled by and/or communicate with the control device 150, so as to adjust one or more angle of the first laser beam. In one implementation, the first group of optical components may include a refractive lens to focus the first laser beam onto a position on the sample. Optionally, the refractive lens may be an objective lens. In another implementation, the first laser beam may be transmitted onto the sample in an epi-illumination mode. In another implementation, the first group of optical components may include a two-axis galvanometer pair of mirrors, so as to assist the alignment of the pulse laser beam.

In step 216, the second group of optical components 122 in FIG. 1A may collect first optical signal emitting from the first location of the sample onto a detector to obtain first raw electric signal. The second group of optical components 122 may include at least one of the following: a mirror, a lens, an objective lens, a beam splitter, an aperture, or a grating. The first group of optical components 121 and the second group of optical components 122 may share one or more common optical component. In one implementation, the first group of optical components 121 and the second group of optical components 122 may share a refractive lens, which focuses the first laser beam onto the first location on the sample and also collects the first optical signal emitting from the first location of the sample. In another implementation, the second group of optical components may include a reflective off-axis parabolic mirror to focus the collected first optical signal on the photonic detector. In another implementation, the detector may depend on one or more of different detection methods. For example, one method includes directly using the residual intensity of the optical beam, e.g., thermal detectors and/or photonic detectors. Other indirect methods may include secondary optical probe beam, an acoustic probe, and/or a mechanical probe. In another implementation, the detector may include at least one of the following: a mercury cadmium telluride (MCT) detector; an uncooled bolometer; or a visible detector in conjunction with a visible laser. Optionally, the detector (for example but not limited to, a photonic detector) may be cooled by at least one method of a thermoelectric cooling (TEC) or a cryogenic cooling to decrease noise so as to improve the signal-to-noise ratio (SNR or S/N). In another implementation, this may be an uncooled detector.

In step 218, a first demodulator may demodulate the first raw electric signal, based on the first pulse repetition rate, to obtain a first intensity value corresponding to the first location of the sample. In one implementation, the first demodulator may be a lock-in amplifier. In another implementation, the first demodulator may be a part of a lock-in amplifier. The lock-in amplifier may include one or more demodulators. A demodulator may demodulate raw electric signal to obtain a desirable signal from a background noise based on a specific reference frequency.

In step 220, the control device 150 in FIG. 1A may determine, based on the first intensity value, a first pixel value corresponding to the first spectral frequency in a DFIR spectroscopic image corresponding to the first location of the sample. The control device 150 may comprising a memory storing instructions and a processor in communication with the memory.

The DFIR spectroscopic image may include an array of pixels. Each pixel may include a pixel value for a specific spectral frequency. A specific spectral frequency may be referred as a spectral band. In step 220, the control device determines a pixel value for a spectral band (corresponding to the first spectral frequency of the first pulsed laser beam) for a pixel in the DFIR spectroscopic image corresponding to the first location on the sample. Each pixel in the DFIR spectroscopic image may include more than one pixel values corresponds to more than one specific spectral frequencies.

To determine more pixel values for other pixels in the DFIR spectroscopic image, the method may include changing locations on the sample illuminated by the first pulsed laser beam. In one implementation, the sample may be placed on a movable stage, and the movable stage may communicate with the control device to receive instructions to move in two-dimensional (x and y) or three-dimensional (x, y, and z) axes. The movable stage holding the sample may sweep the sample relative to the first pulsed laser beam to other locations on the sample. The movable stage may be controlled to move in a sweeping motion following a third order trajectory so that the sample is moved in s-curves to minimize unwanted vibrations. In the present disclosure, "sweeping" may refer to a continuous curve in one implementation, and/or may refer to a straight line in another implementation, which are discussed later in the present disclosure. The third order trajectory may include a third order polynomial curve. A field of interest (FOI) on the sample may have a long axis and a short axis, for example, when the FOI has a rectangle shape with its length longer than its width, a long axis is along its length direction and a short axis is along its width direction. The sweeping motion may be performed along the long axis of the FOI so as to decrease image acquisition time.

In another implementation, the first group of optical components (121 in FIG. 1A) may include at least one rotatable mirror. The at least one rotatable mirror may communicate with the control device to receive instructions to rotate so as to steer/scan the first pulsed laser beam to other locations on the sample.

Figure 3:
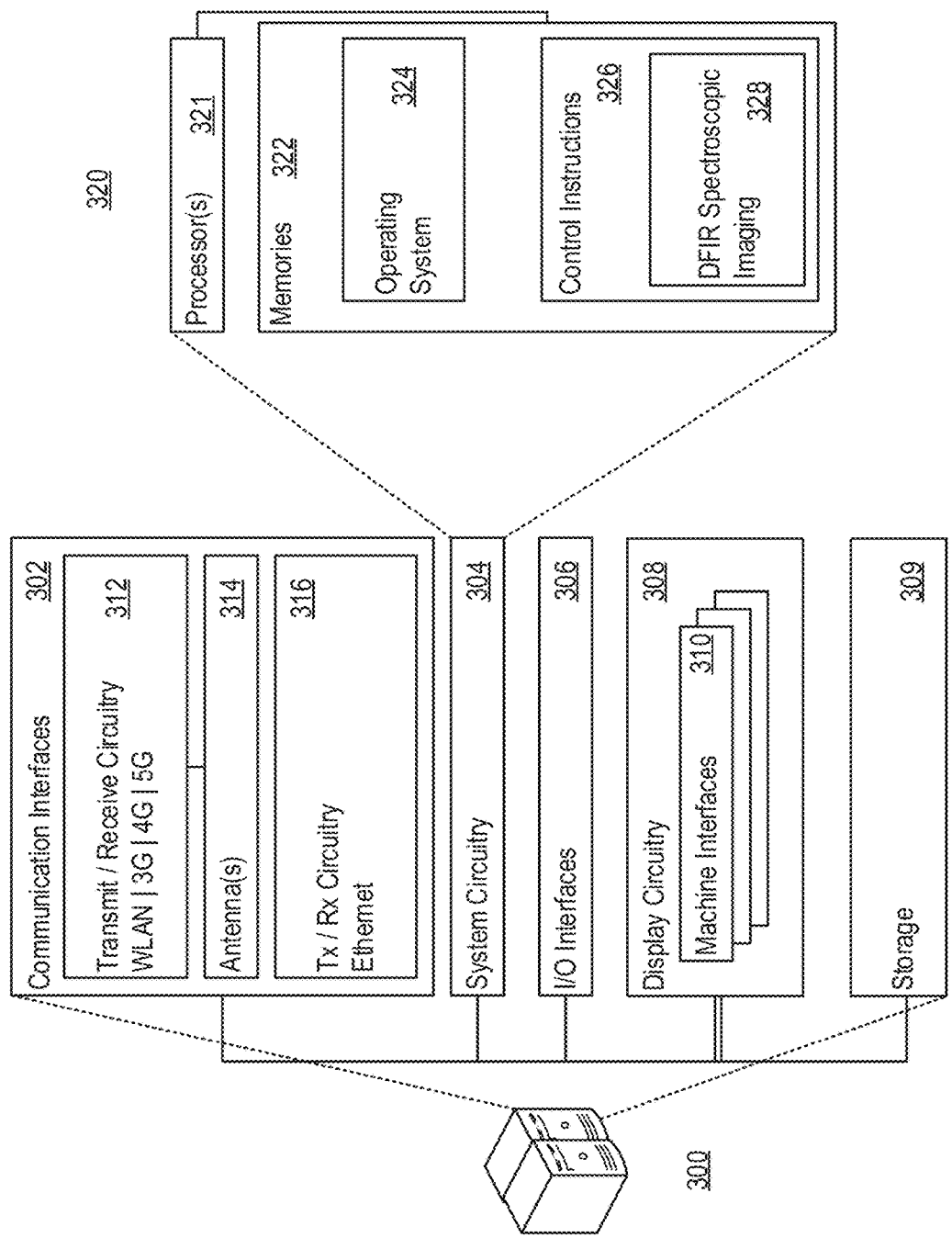
FIG. 3 shows an electronic device that may be used to implement the control device in FIGS. 1A, 1B, 1C, and/or 1D.

FIG. 3 shows an exemplary device, for example, a computer system 300, for implementing the control device 150 for performing DFIR spectroscopic imaging. The computer system 300 may include communication interfaces 302, system circuitry 304, input/output (I/O) interfaces 306, storage 309, and display circuitry 308 that generates machine interfaces 310 locally or for remote display, e.g., in a web browser running on a local or remote machine. The machine interfaces 310 and the I/O interfaces 306 may include GUIs, touch sensitive displays, voice inputs, buttons, switches, speakers and other user interface elements. Additional examples of the I/O interfaces 306 include microphones, video and still image cameras, headset and microphone input/output jacks, Universal Serial Bus (USB) connectors, memory card slots, and other types of inputs. The I/O interfaces 306 may further include keyboard and mouse interfaces.

The communication interfaces 302 may include wireless transmitters and receivers ("transceivers") 312 and any antennas 314 used by the transmitting and receiving circuitry of the transceivers 312. The transceivers 312 and antennas 314 may support Wi-Fi network communications, for instance, under any version of IEEE 802.11, e.g., 802.11n or 802.11ac. The transceivers 312 and antennas 314 may support mobile network communications, for example, 3G, 4G, and 5G communications. The communication interfaces 302 may also include wireline transceivers 316, for example, Ethernet communications.

The storage 309 may be used to store various initial, intermediate, or final data or model for performing DFIR spectroscopic imaging. These data corpus may alternatively be stored in an external database. The storage 309 may be centralized or distributed, and may be local or remote to the computer system 300. For one example, a data server may be located in the same room/building and connect to the computer system 300 via wireless/wire communication. For another example, the storage 309 may be hosted remotely by a cloud computing service provider.

The system circuitry 304 may include hardware, software, firmware, or other circuitry in any combination. The system circuitry 304 may be implemented, for example, with one or more systems on a chip (SoC), application specific integrated circuits (ASIC), microprocessors, discrete analog and digital circuits, and other circuitry.

In one implementation, for example, the system circuitry 304 may be implemented as the control device 150 in FIG. 1A. The system circuitry 320 may include one or more processors 321 and memories 322. The memories 322 stores, for example, control instructions 326 and an operating system 324. The control instructions 326, for example may include instructions for performing DFIR spectroscopic imaging 328. In one implementation, the instruction processors 321 execute the control instructions 326 and the operating system 324 to carry out any desired functionality related to performing DFIR spectroscopic imaging.

Referring to FIG. 1B, another embodiment may include an apparatus for performing discrete frequency infrared (DFIR) spectroscopic imaging. In the embodiment, more than one laser beams may interact with the sample in a sequential manner, one demodulator may demodulate more than one signals corresponding to the more than one laser beams in a sequential manner. The apparatus may include a portion or all of the following: a first laser source 111, a second laser source 112, a first group of optical components 121, a sample and/or stage 125, a second group of optical components 122, a detector 130, a first demodulator 141, and/or a control device 150. The apparatus may include more than one laser sources to generate the more than one laser beams, for example, 2, 3, 4 or 8. The more than one laser beams may have same pulse repetition rate or have different pulse repetition rates.

Referring to FIG. 2B, the method 210 may, optionally, further include a portion or all of the following steps: step 232: generating, by a second laser source, a second pulsed laser beam comprising a second spectral frequency in the mid-IR region and the first pulse repetition rate; step 234: transmitting, by the first group of optical components, the second pulsed laser beam onto the first location of a sample; step 236: collecting, by the second group of optical components, second optical signal emitting from the first location of the sample onto the photonic detector to obtain second raw electric signal; step 238: demodulating, by the first demodulator based on the first pulse repetition rate, the second raw electric signal to obtain a second intensity value corresponding to the first location of the sample; and step 240: determining, by the control device and based on the second intensity value, a second pixel value corresponding to the second spectral frequency in the DFIR spectroscopic image corresponding to the first location of the sample. The first spectral frequency and the second spectral frequency are different, and the first pulsed laser beam and the second pulsed laser beam are transmitted onto the first location of the sample in a sequential manner.

Figure 1C:
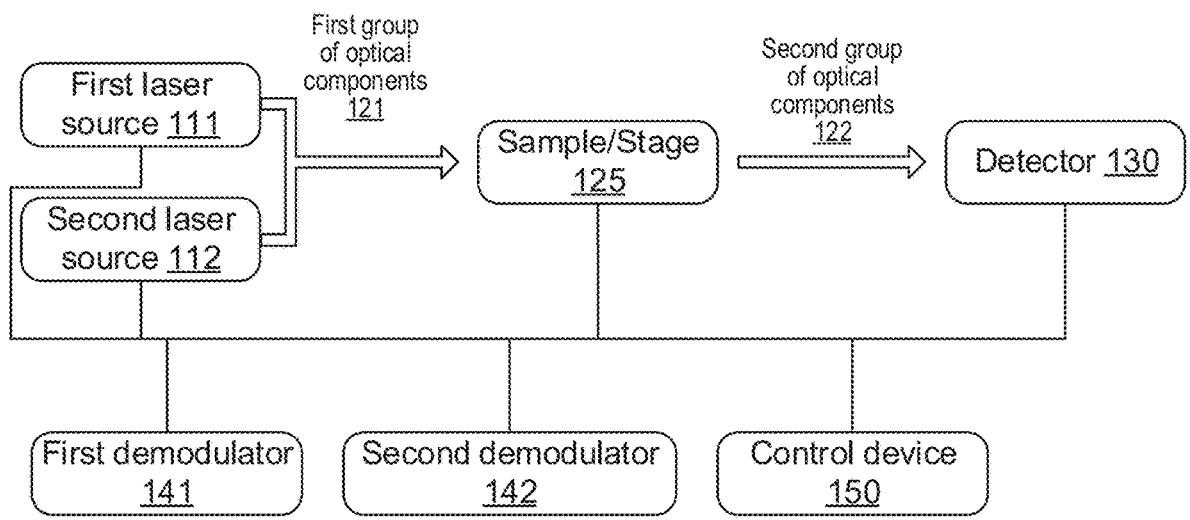
FIG. 1C shows a schematic diagram of another embodiment of an apparatus for performing multi-color discrete frequency infrared spectroscopic imaging in a simultaneous manner.

Referring to FIG. 1C, another embodiment may include an apparatus for performing discrete frequency infrared (DFIR) spectroscopic imaging. In the embodiment, more than one laser beams with different pulse repetition rates may interact with the sample in a simultaneous manner, and more than one demodulators may demodulate more than one signals corresponding to the more than one laser beams in a simultaneous manner, wherein each of the more than one demodulators demodulates corresponding signal based on a corresponding pulse repetition rate. The apparatus may include a portion or all of the following: a first laser source 111, a second laser source 112, a first group of optical components 121, a sample and/or stage 125, a second group of optical components 122, a detector 130, a first demodulator 141, a second demodulator 142, and/or a control device 150. The apparatus may include more than one demodulators to demodulate, based on more than one different reference frequency, signals corresponding to more than one laser beams in a simultaneous manner, for example, 2, 3, 4 or 8. Each of the laser source may include one or more QCL module.

Referring to FIG. 2C, the method 210 may, optionally, further include a portion or all of the following steps: step 252: generating, by a second laser source, a second pulsed laser beam comprising a second spectral frequency in the mid-IR region and a second pulse repetition rate; step 254: transmitting, by the first group of optical components, the second pulsed laser beam onto the first location of a sample; step 256: collecting, by the second group of optical components, second optical signal emitting from the first location of the sample onto the photonic detector to obtain second raw electric signal; step 258: demodulating, by a second demodulator based on the second pulse repetition rate, the second raw electric signal to obtain a second intensity value corresponding to the first location of the sample; and step 260: determining, by the control device and based on the second intensity value, a second pixel value corresponding to the second spectral frequency in the DFIR spectroscopic image corresponding to the first location of the sample. The first spectral frequency and the second spectral frequency are different, the first pulse repetition rate and the second pulse repetition rate are different, and the first pulsed laser beam and the second pulsed laser beam are transmitted onto the first location of the sample simultaneously.

Figure 1D:
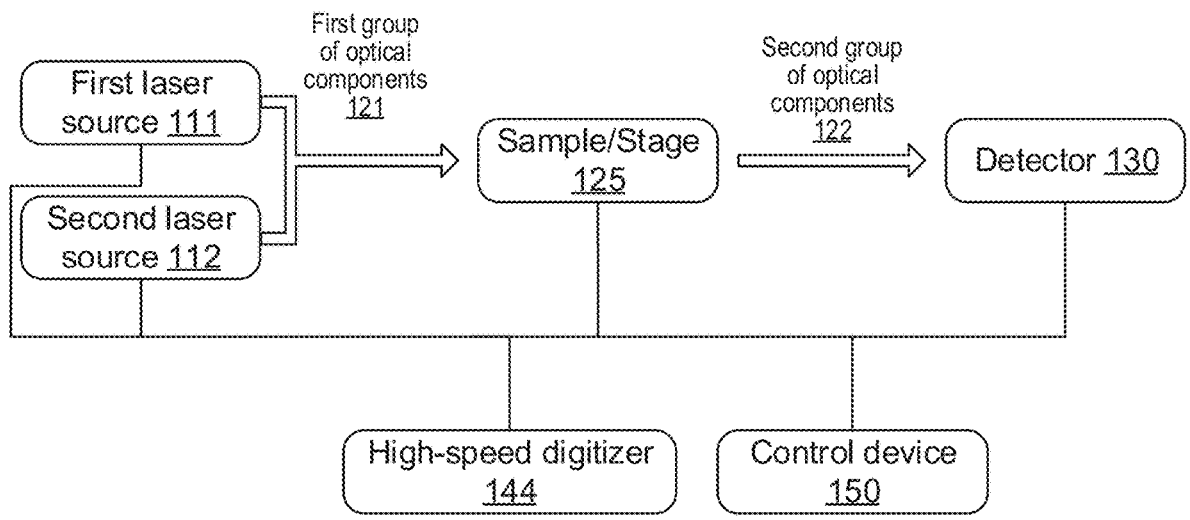
FIG. 1D shows a schematic diagram of another embodiment of an apparatus for performing multi-color discrete frequency infrared spectroscopic imaging in a simultaneous manner.

Referring to FIG. 1D, another embodiment may include an apparatus for performing discrete frequency infrared (DFIR) spectroscopic imaging. The apparatus may include a portion or all of the following: a first laser source 111, a second laser source 112, a first group of optical components 121, a sample and/or stage 125, a second group of optical components 122, a detector 130, a high-speed digitizer 144, and/or a control device 150.

Referring to FIG. 2D, the method 210 may, optionally, further include a portion or all of the following steps: Step 272: generating, by one or more subsequent laser, in bursts wherein each laser of the one or more subsequent laser is delayed relative to the previous laser by at least 1 pulse width duration; step 274: separating, by a high-speed data acquisition device, individual lasers, wherein corresponding to each of the first burst, the first set of raw electric signals is used to obtain a first set of intensity values corresponding to the first location of the sample; and step 276: determining, by the control device and based on the first set of intensity values, a first set of pixel values corresponding to the first set of spectral frequencies in a DFIR spectroscopic image corresponding to the first location of the sample. In one implementation, the high-speed data acquisition device may include a high speed digitizer.

Imaging instruments may be designed in widefield configuration or in scanning configuration, with fixed frequency sources or with broadly tunable sources as advanced lasers became more prevalent. IR light from a QCL may be condensed onto the sample and the residual signal after attenuation is imaged using an uncooled bolometer camera or cooled mercury-cadmium-telluride (MCT) focal plane array or other detector with compatible spectral range sensitivity. In this configuration, the narrow spectral bandwidth of the coherent laser, multiple reflections within the optical train, stray light and scattering from the sample may result in speckle that degrades image quality. Since the analytical quantity of interest is absorbance, a ratio of the recorded signal from a sample to a reference signal may be measured. The ratio may be a measure of total beam attenuation, which includes contributions from both absorption and scattering. Since scattering is wavenumber and morphology dependent, errors may arise in correct estimation of absorbance.

In Fourier transform infrared (FT-IR) imaging, the scattering contribution may be largely subtracted from recorded attenuation by using a nearby non-absorbing region to estimate the slowly-varying scattering. Other correction methods may also work well, primarily because the incoherence of the thermal source does not result in additions of the scattered electric fields but of intensities. For a coherent source, scattered field additions may manifest in the formation of speckle patterns and may not simply be subtracted out due to redistribution of light in the spatial plane. Measuring the sample again at identical location but with a non-absorbing frequency tens or hundreds of wavenumbers away may alleviate the non-uniformity of laser illumination but may not be effective in alleviating speckle patterns. Hence, several additional techniques may be used to mitigate speckle effects. In one implementation, rotating diffusers may rapidly vary the speckle pattern while integrating the signal over time. In another implementation, spectral averaging may integrate the fluctuating speckle patterns as the laser tuner sweeps. In another implementation, time delayed integration may average speckle pattern by shifting the sample. Regardless of their individual efficacy for specific samples, these methods may not provide a general solution to scattering induced effects. They may also increase experimental times, which reduce the multichannel detection advantage of wide-field imaging.

For the embodiments in the present disclosure, exceptional image quality may be obtained with scanning systems that map the sample point by point. These scanning systems may typically have higher imaging quality simply due to the ability to condense light with substantially higher intensities per illuminated area but are also immune to many of the drawbacks observed for widefield systems. First, only a single point is illuminated and detected at a time; hence, recorded intensity may be affected by coherent addition of scattered light only from a very small (single pixel) area. Without the need to average laser speckle over time, spectra or space, absorbance at single locations may be recorded in much shorter time. Second, high laser powers may not be required, as covering large areas and a flat-field illumination is no longer required. With these advantages, the image quality and signal-to-noise ratio (SNR) of these systems may facilitate the development of analytical capabilities not previously possible with DFIR systems. Finally, point illumination may enable the development of instruments that measures both transmitted light and novel means to measure absorption, e.g. through photoexpansion of the sample using devices such as nanoscale cantilevers with corrections, acoustic transducers, and visible light probes. These approaches may use optics and detectors that are not photonically sensitive in the mid-infrared.

One of the possible drawback of point scanning systems may be a loss of speed in acquiring images compared to widefield systems. Since each point is measured individually, the advantages of higher fidelity data may sufficiently offset the inefficiency of scanning. Several designs of point scanning systems may build up the image by raster scanning a point across the sample as fast as possible. In the visible spectrum, laser scanning confocal microscopes commonly incorporate mirror galvanometers and resonant scanners. The optical design of these involves scan lenses, tube lenses, and infinity-corrected objectives each containing many refractive elements. This may be difficult in the mid-infrared spectrum as chromatic and field corrections are more complicated and expensive when recording a spectral range 20-fold larger while being restricted to a very limited selection of IR compatible materials with viable dispersion characteristics. IR scanning systems may have relied on on-axis scanning by either sweeping the lens or sweeping the sample. The present disclosure describes various embodiments with a point scanning system that operates by sweeping the sample. The present disclosure describes optimization of the system and demonstrates a new technique that can increase data acquisition rates using simultaneous illumination at dual frequencies. The present disclosure also describes and evaluates this "multi-color" scanning approach.

Exemplary Embodiment 1

Figure 4A:
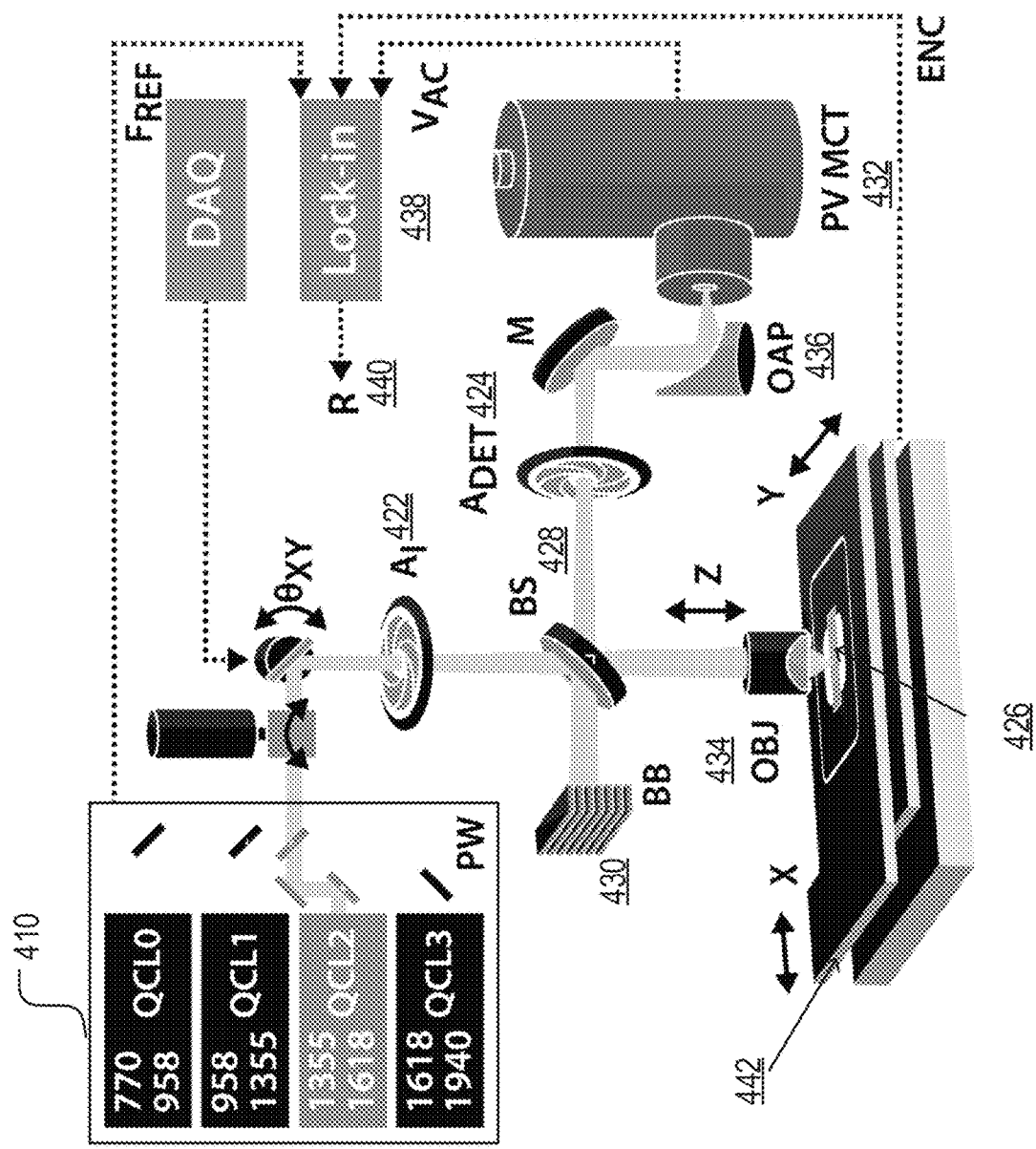
FIG. 4A shows a schematic of an exemplary embodiment of an apparatus for performing multi-color discrete frequency infrared spectroscopic imaging.

For an example but not limited to, FIG. 4A shows an embodiment of an apparatus/system for performing DFIR spectroscopic imaging. The system is powered by an array of QCL modules 410 that together have a tuning range that spans the mid-IR region (for example, a mid-IR fingerprint region). Dual apertures ($A_I$ 422 and $A_{DET}$ 424) equidistant from the sample 426 on the illumination and detection paths are aligned such that they have identical focal points in the sample plane. Half the beam is split with a beam splitter (BS 428) to the sample and half blocked by a beam block (BB, 430) and focused onto the sample and detector 432 using a refractive lens, for example objective lens (OBJ, 434) and a reflective off-axis parabolic mirror (OAP, 436) respectively. The design of the microscope allows for epi-illumination of the sample with an interchangeable selection of 3 objectives with numeric apertures (NA) 0.56, 0.71, and 0.85, which spans the range of NAs in most IR imaging studies. The transflected signal is detected by a cryogenic photovoltaic mercury cadmium telluride (PV MCT) detector 432 without pre-amplification or biasing, and demodulated using a lock-in amplifier 438 referenced to the QCL's pulse repetition frequency. The magnitude (R, 440) of the signal's in-phase and quadrature components is used to form the image as the stage 442 scans the sample 426. A standard white-light epi-illuminated inverted microscope (not illustrated) is built underneath the microscopy stage and used for targeting selecting the area for IR scanning as well as additional features later described.

Figure 4B:
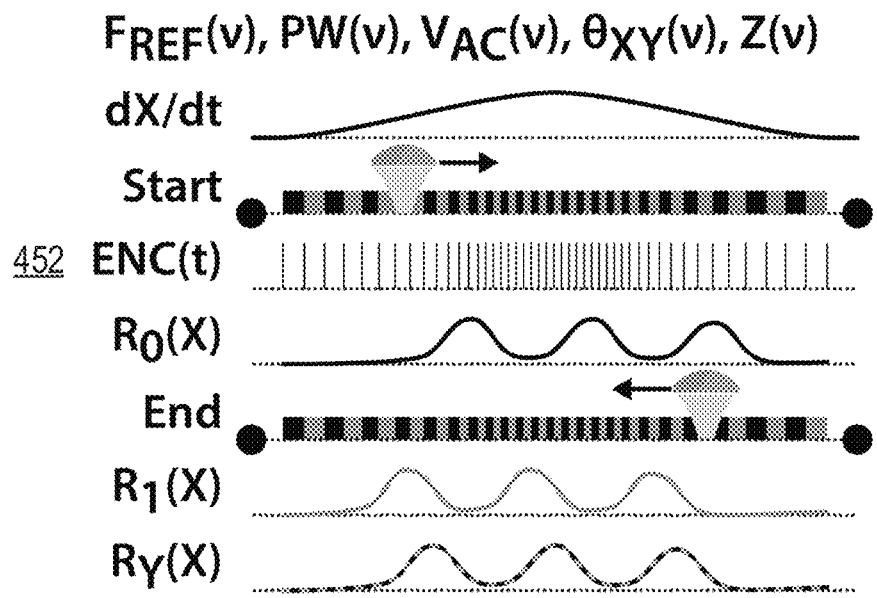
FIG. 4B shows a signal diagram of an embodiment described in the present disclosure.

The embodiment may include several subroutines that carefully increase the fidelity of the acquired signal but operate in the background as diagrammed by FIG. 4B. First, the power stability of each wavenumber may be a function of the laser's repetition rate ($F_{REF}$) and pulse width (PW). This may not be consistent even within the tuning range of each of the four lasers. Before scanning an image, these parameters may be either (in priority) overridden by the user, directly selected from a pre-calibrated table of optimal settings, automatically estimated using the nearest entry in the table, or restored to default which will result in a loss of SNR of undetermined magnitude. The laser's intensity ($V_{AC}$) and pointing angle ($\theta_{XY}$) may also be unique so that the sensitivity of the lock-in amplifier and galvanometer angle corrections are adjusted respectively. Chromatic dispersion tables, simulated with Code V (for example but not limited to, Synopsys), may be used to estimate the jump in focal position (Z) before running a quick short-range autofocus subroutine. The magnification of mapping systems may be arbitrarily adjustable to optimize each image by wavenumber (v). The pixel size ($\Delta X \leq d_{XY}/2$) may be adjusted proportional to the lateral point spread function ($d_{XY} \approx 1.22/\nu NA$). To prevent aliasing due to excessively low sampling rate and to minimize noise in the signal, the lock-in time constant ($\tau = C^{-1} t_{\Delta X}$) may be set relative to the minimum pixel dwell time ($t_{\Delta X}$) where C is a parameter specific to the lock-in amplifier that has a low-pass filter order that reaches steady state in $C\tau$.

The axial tolerance of the scanner's ability to trace the sample substrate may be coupled to the axial point spread function ($d_Z \approx 2 d_{XY}$). Any deviations as the sample moves out of focus may result primarily in a loss of power. Vibrations manifest as image striping, while a slanted sample causes vignetting. This may become problematic since absorbance measurements are referenced to the original laser power, often taken at a single point with ~100% reflectance on the background. Clearly, a single background measurement is not enough when the power varies by position. The embodiment may include one or more method to address this problem. The first performs a ~9-point autofocus across the sample and calculates a best-fit plane. Manual sample levelling improves results, minimizing the required travel range of the z-axis, but even a carefully adjusted sample is still not flat. The scanner corrects for residual misalignment by tracing the sample in 3 dimensions, keeping parallel with the substrate regardless to how it is mounted. Secondly, following the mechanical corrections, an interpolated background plane instead of a single background value may be referenced to.

Once these initialization procedures are completed, the instrument may be designed to scan the sample line by line. For simplifying discussion, it may be assumed the instrument scans row by row, for example but not limited to, horizontally or vertically. Since the stage coordinates are adjusted to align to the sample plane, any affine transformation matrix is possible, including rotations that scan diagonally. Scan areas may be rectangles, but may not be limited to be rectangles. This framework may improve efficiency by fitting the scan pattern to the arbitrary sample, thereby minimizing the amount of empty space that is wastefully mapped point by point. This feature may also be an advantage over widefield imaging and, for sparse samples like those in cytology, may render point scanning a better option.

When scanning each row, the acquisition may be triggered based on distance traveled, as shown in FIG. 4B. Instead of scanning and acquiring data at a fixed rate, the encoding (ENC, 452) minimizes errors due to acceleration, deceleration, or other velocity instabilities.

The demodulator samples may be triggered by the stage encoder, and the magnitude (R) of the demodulator vector represents the pixel intensity. Since the stage velocity is not constant, this minimizes distortion since the image is formed as function of spatial distance rather than time. For example, at 2-μm pixels, approximately half the size of the point spread function (PSF) and the lowest wavelength, with 50-nm encoder spacing, the counter outputs a single TTL pulse per 40 ticks. The instrument may acquire images at any resolution as long as the pixel size is rounded to an integer multiple of the encoder spacing.

A consequence is that pixel dwell time is not uniform across the scan direction. The pixel dwell time is the time the focused laser beam rests on a single pixel and illuminates it. Therefore, the longer the pixel time, the more photons can be collected per pixel, and the lower the scan speed will be. Pixel dwell time is shortest when the stage is at maximum velocity near the center of the sample. Noise remains consistent throughout since the lock-in amplifier's time constant is dependent on the shortest pixel dwell time. The steady stage value of each pixel may be measured Cr after each trigger and error in the delay creates an offset between the forward and backward scans.

Figure 4C:
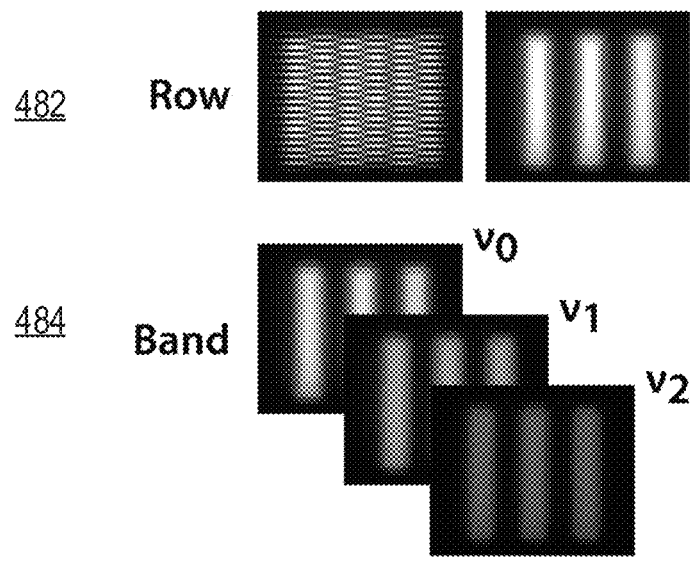
FIG. 4C shows a schematic post-processing of an embodiment described in the present disclosure.

Image alignment procedures to first align the rows 482, and then to align the frequency bands 484 is necessary, as show in FIG. 4C. Row alignment is graphic processing unit (GPU) accelerated and performed in MATLAB where the odd and even lines are non-rigidly registered only in the x-direction to correct for residual local distortions. To reduce memory requirements, the data may be binned prior to registration and correspondingly the calculated displacement fields may be scaled afterwards. Once each band is constructed, the bands may be aligned with each other to account for sample drift. This is tracked using the IR images or more accurately by using the white light images from the inverted brightfield microscope if imaging on a transparent substrate.

The displacement is calculated by detecting corners using the features from accelerated segment test (FAST) algorithm, using the fast retina key point (FREAK) algorithm to match the key points between successive images, and finally estimating the geometric transform. Inaccurate band alignment may result in corrupted spectra. A point spectrum extracted from a multispectral cube acquired from a system that measures spatial before spectral information must be averaged within a window of surrounding pixels representing the area of uncertainty due to sample drift. In the opposing case, for instance all FT-IR instruments and some QCL DF-IR instruments, which acquire all spectral information at a given location before moving the sample, the averaging is unnecessary. Errors due to sample drift may appear as misaligned image tiles and this type of error may be less impactful for most chemical imaging applications.

Figure 5A:
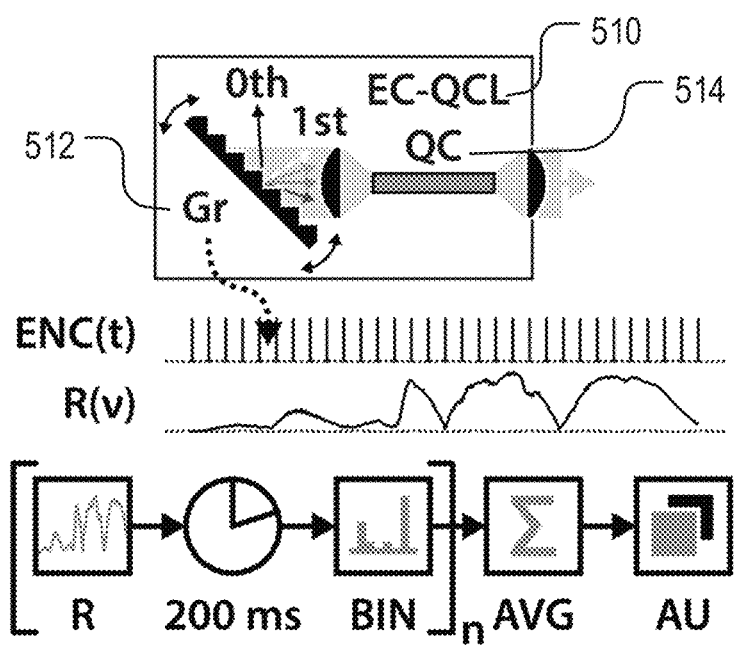
FIG. 5A shows a control scheme of an embodiment describes in the present disclosure.
Figure 5B:
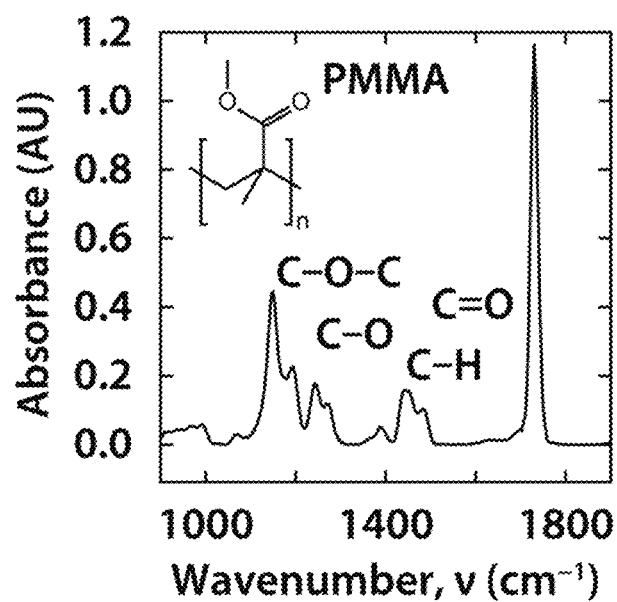
FIG. 5B shows a standardized diagnostic spectrum of an embodiment describes in the present disclosure.

One of the disadvantages of discrete frequency systems may be the necessity of prior knowledge of the sample to optimally select useful spectral features for imaging. To acquire full spectra when needed, a flexibility in design may be built-in by enabling use as a rapid scanning point spectrometer. This capability may be analogous to the ability of FT-IR imaging systems to provide a single spectrum. Along with a standard white-light epi-illuminated inverted microscope (not illustrated) built underneath the microscopy stage for targeting the spectrometer, representative spectra of key locations on the sample may be rapidly collected. One example of the control scheme of the spectrometer is shown in FIG. 5A, which may be essentially identical to an FT-IR spectrometer where spectral information is computationally derived from the physical position of a moving reference mirror encoded with a co-propagating reference laser. In QCL spectrometer design, the spectral tuning of an external cavity (EC) QCL 510 is relative to the rotation of a grating (Gr, 512) that directs a specific frequency into the quantum cascade (QC, 514) gain medium where the wavenumber is tracked by a TTL signal at every 0.5 $cm^{-1}$. Spectral resolution and SNR may not depend on acquisition time as they do for an FT-IR spectrometer. The raw data acquired here is 0.5 $cm^{-1}$ spaced, but the data is typically binned to 4 $cm^{-1}$ for better SNR. The small piezoelectric-driven grating can be oscillated quickly. The system may acquire fingerprint spectra at 4 $cm^{-1}$ resolution every 200 millisecond (ms) and co-average 10 iterations to obtain the diagnostic PMMA thin film spectrum shown in FIG. 5B at 0.5 Hz. These specifications may be adjustable according to the experiment and viable spectra can be acquired at up to 10 Hz.

The present disclosure describes FT-IR reference images and spectra, which may be acquired using a microscope with a spectrometer, for example, Cary 620-IR imaging microscope with a 680-IR FT-IR spectrometer. This microscope may be equipped with a liquid nitrogen cooled 128×128 pixel focal plane array (FPA) detector and a 0.62 NA reflective objective, for example, Schwarzschild objective with 36× total magnification resulting in pixel sizes of 1.1 micrometer (μm). Images may be collected with 16 coadditions at 4 $cm^{-1}$ resolution, processed with a Blackman-Harris apodization function, and then ratioed to a 128 coaddition background. QCL-equipped spectrometer data may be acquired as described with each configuration in this study. Average FT-IR point spectra may be collected using the 250 μm single element detector in approximately 2 second with 16 coadditions at 4 $cm^{-1}$ resolution with an asymmetric single sided interferogram sampling speed of 75 kHz and a reference laser sampling interval of 2. Chrome on glass USAF 1951 resolution test targets (II-VI Max Levy) may be used for resolution testing since glass has broadband IR absorbance and the thin chrome plating does not introduce scattering artifacts. PMMA film may be spun coat on low-emissivity microscope slides at 1 μm thickness and used for spectrometer calibration. SU-8 photoresist USAF 1951 resolution test targets may be prepared on low-e microscope slides at 5 μm thickness, a common biological sample thickness, and used for to test multi-color imaging.

The key performance metric in design of any instrument may be the SNR. The analytical signal (absorbance) is determined by the sample in IR spectroscopy and noise is the metric for comparison. Two sources of noise may be examined in imaging. The first is the variation across the field of view, while the second is the spectral noise at any point. The spatial noise includes a component arising from spectral noise (at every pixel) and variations in the image (arising from illumination, focusing, drift or other sources). In addition, each system has its unique spatial noise contributions. In point scanning systems, abrupt motion of the microscope stage can vibrate the sample and appear as low frequency directional fluctuations in absorbance. Similarly, sensor non-uniformity of the staring array provides a spatial noise for widefield FT-IR imaging systems. Hence, it may be instructive to examine spatial noise first.

Figure 6A:
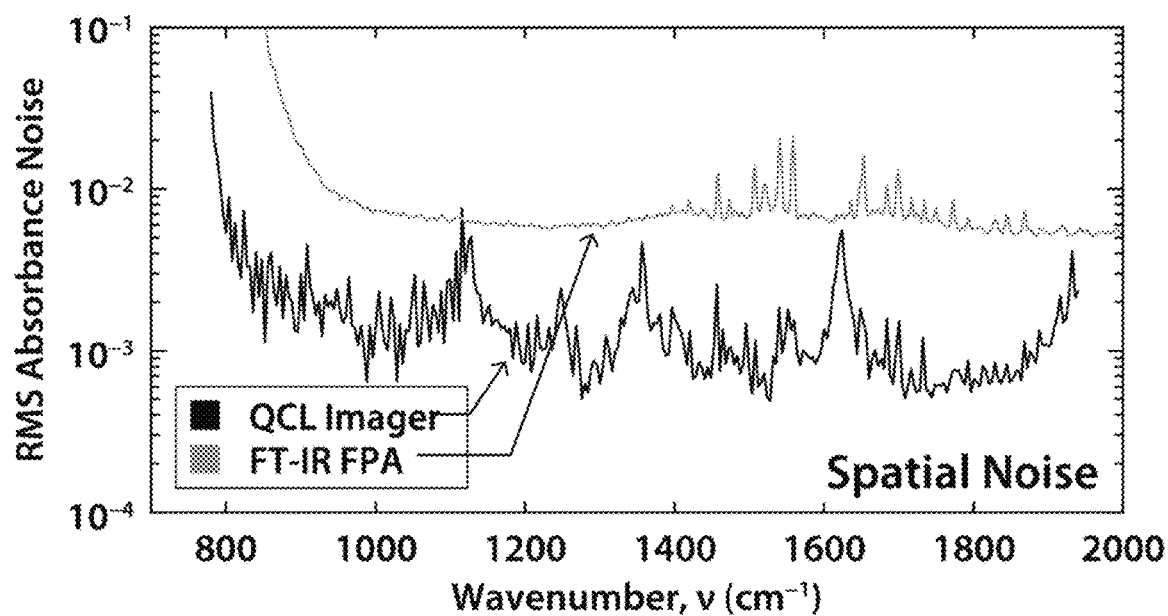
FIG. 6A shows a chart describing spatial root-mean-square (RMS) noise, calculated using spatial variance of recorded data at each band in a hyperspectral image acquired using an embodiment in the present disclosure and compared to a Fourier transform infrared (FT-IR) imaging system.
Figure 6B:
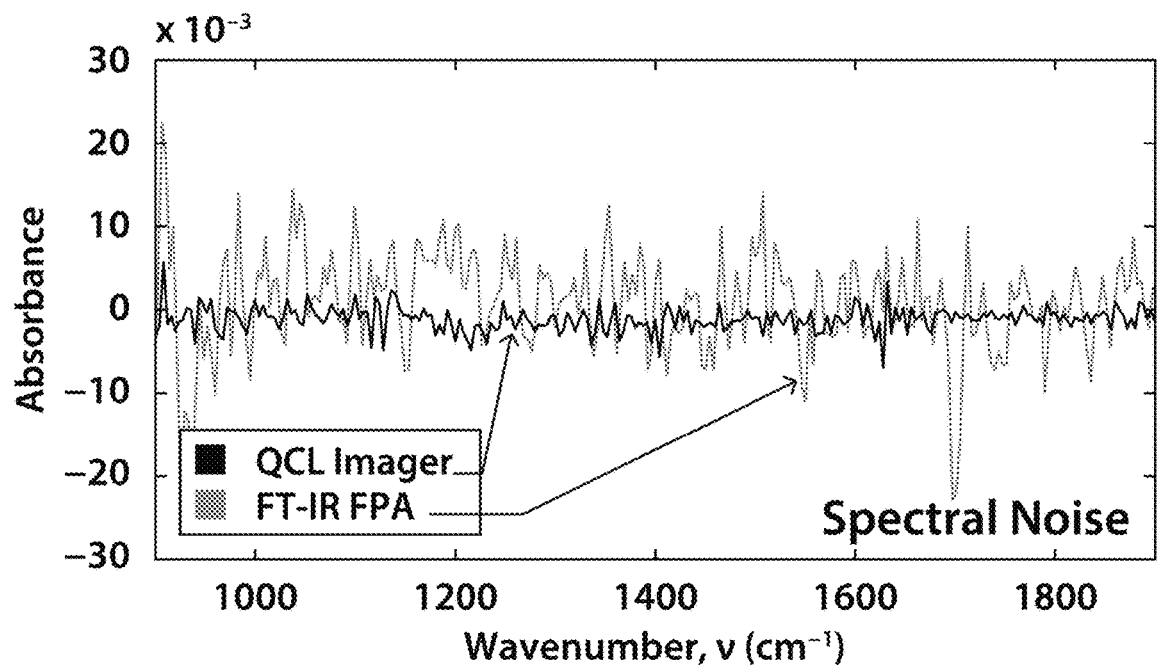
FIG. 6B shows a chart describing 100% spectral lines from a single pixel under typical experimental conditions.
Figure 6C:
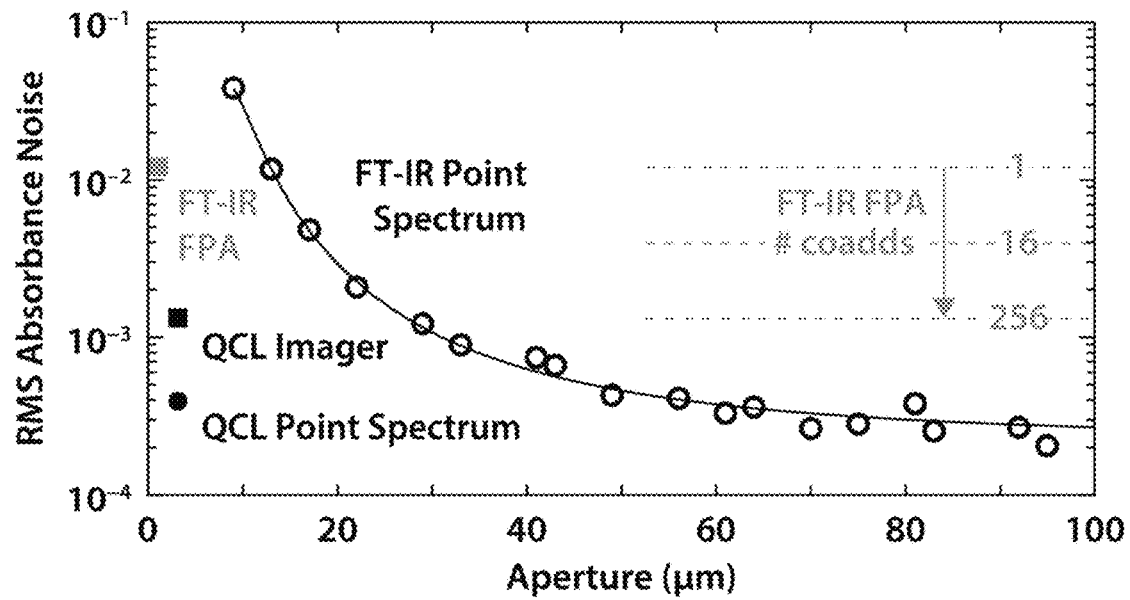
FIG. 6C shows a chart describing RMS noise of the 100% line with different aperture settings in a commercial single point FT-IR microscope and its comparison with an embodiment in the present disclosure.

The noise characteristics of the DFIR scanning system are compared to a leading, commercially-available FT-IR imaging spectrometer in FIGS. 6A, 6B, and 6C. FIG. 6A shows spatial root-mean-square (RMS) noise, calculated using spatial variance of recorded data at each band in a hyperspectral image acquired using the developed DFIR point scanning and commercial, widefield FT-IR imaging systems. FIG. 6B shows 100% spectral lines from a single pixel under typical experimental conditions. FIG. 6C shows RMS noise of the 100% line with different aperture settings in a commercial single point FT-IR microscope and its comparison with the point scanning DFIR system.

Noise in each case is calculated as the root-mean-square (RMS) of each band for similar fields of view. As anticipated, the noise across the FT-IR image is devoid of spectral features (other than increased noise due to water vapor lines). The noise in DFIR imaging data is influenced by several factors but mostly dependent on the design of the composite QCL (consisting of four individual modules). Variable noise may be observed that corresponds to changes in the emission spectrum of each module of the composite source.

Noise control for the DFIR microscope may be determined by adjusting scan speeds to affect pixel dwell times, while the lock-in time constant and filter orders are set such that their settling time resides within the minimum dwell time of any pixel. Consequently, for each pixel, the number of laser pulses recorded may be the same, regardless of dwell time at any specific position with respect to the range of stage motion. These controls may ensure that the SNR achieved is both maximized and consistent across the image. Optionally, if the stage velocity is decreased, pixel dwell times may increase causing the system to select longer filter time constants thereby improving SNR further without needing repeated co-averaged scans.

It may be notable that noise in the QCL system here is approximately one order of magnitude lower as the advantage of a low noise sensor and higher source intensity overcomes the multichannel and multiplex advantages of the FT-system. Spectral noise reduction algorithms such as the minimum noise fraction (MNF) method can reduce the FT-IR RMS noise by less than an order of magnitude, which presents an opportunity to increase data quality using the white noise properties of the FT spectra. However, it may be noted that the noise reduced data is an estimate arising from a model of noise and the native precision of the data does not increase with mathematical methods. Similarly, DFIR systems' speed can be increased significantly by only acquiring data needed for particular applications. While the native recorded SNR of the QCL system will be higher, conversely, spectral noise rejection methods may typically be unusable for discrete frequency data sets with a small number of recorded bands.

While overall noise in an imaging data set may be a primary metric, it is also instructive to estimate the noise and spectral reproducibility of the instrument using single pixel spectra. Spectra may be compared by examining the 100% spectral lines acquired on a reflective surface, as shown in FIG. 6B. These spectral lines are extracted from the hyperspectral data set acquired with DFIR and FT-IR instruments at typical experimental settings described previously in the methods. The comparisons of spectral and spatial noise show that the DF instrument is capable of lower noise performance, often in much less time. The DF system benefits from real-time coaddition as previously noted, whereas the high performance of the FT-IR spectrometer, despite an orders of magnitude weaker source, attests to the effectiveness of spectral multiplexing of the continuous spectrum (Fellgett's advantage). This advantage may have allowed FT-IR spectroscopy to dominate all other forms of spectral acquisition in the mid-IR range for nearly five decades.

While the above comparison is valid for imaging, it is also instructive to examine the performance of the QCL-DFIR spectrometer against the performance of a single point FT-IR spectrometer. 100% lines may be acquired using a point detector, similar to that used in our QCL instrument, on the FT-IR imaging system. To compare with the point scanning system, the microscope's physical aperture may be restricted to decreasing sizes and the noise levels may be calculated. FIG. 6C shows the noise in recorded 100% lines as the aperture is closed from 100 μm; in all cases, the data are acquired by signal averaging for 2 s to keep the total measurement time approximately equal to the DFIR spectrometer. As the aperture is reduced to 10 μm, noise rises and eventually light throughput is too low for measurements at diffraction-limited pixel sizes. For larger aperture sizes, noise decreases and stabilizes for larger aperture sizes once the detector area is filled. A comparison of the 100% lines reveals that the performance of the ~3 μm focal spot of the QCL system is matched by 30-60 μm aperture sizes in the FT-IR system across the spectral bandwidth. For localized measurements, FPA measurements are advantageous as each pixel has effectively a virtual aperture and there is no loss of intensity, though the minimum sampling area is defined by the point spread function (PSF) of the system optics, not the magnification. Each of these physically smaller (39-fold) individual elements on the FPA have lower readout noise which is dominant in low light conditions. Additional coadditions (for example, up to 256) may reduce the noise such that the averaged measurement is competitive with QCL noise levels. In the ideal conditions at maximum aperture, the performance of a highly stable FT-IR thermal source illuminating a single element detector is unmatched.

The advantages of QCL systems may appear in measurements with resolutions under ~60 μm because a coherent source may be condensed to a much smaller focal point with enough power remaining to effectively illuminate a detector. The minimum focal spot achievable with an incoherent thermal source depends on the magnification of the system and the size of the source which is comparatively large. Further windowing is necessary to restrict the measurement area which also restricts the available light and consequently degrades the SNR. Thus, on both spectral and spatial measures, it may be concluded that the performance of an FT-IR imaging system for a full spectrum at a given pixel has been exceeded when small areas (smaller than 50 μm×50 μm) are measured per pixel. This is essentially the microscopy regime and the improved performance of QCL-based microscopes represents is now better than comparable FT-IR imaging. This is a major milestone in IR spectral analyses, wherein an appropriately utilized, high laser power has overcome the dominant multiplex and multichannel advantages of FT-IR imaging. While the spectral range of QCLs cannot yet cover the full range of FT-IR instruments, laser innovations are continuing to bridge the gap.

The present disclosure also compares the imaging rates between scanning systems that record data while in motion versus array-based microscopes that record multi-pixel fields of view (FOV) which are stitched together as a mosaic. The imaging time of an FPA equipped system (Equation 1) to measure a specific area at a defined data quality (SNR) may be linearly dependent on the total pixels in the image ($n_X \times n_Y$) scaled by that in the FPA FOV ($n_{FPA}$) and the time it takes to acquire each interferogram ($t_{INT}$), which is a function of the inverse of the spectral resolution ($\Delta v$). SNR normalization increases the number of coadditions ($n_C$) for each FOV. For a scanning system, however, the scaling may not be as straightforward (Equation 2). Efficiency is maximized at peak stage velocity. One option is to accelerate to peak stage velocity as quickly as possible and to hold that velocity constant for the largest fraction of time. These abrupt dynamics tend to degrade SNR, increase instability due to overshoot, and lengthen settling time. Instead, the motion of the scanning stage follows a $3^{rd}$ order trajectory to sweep the sample in s-curves minimizing unwanted vibrations. The time to traverse each line ($t_{LINE}$) is dependent on its length; the number of pixels ($n_X$) nor the size of pixel ($\Delta X$) alone do not affect scan times. Instead, scan times for each band is primarily scaled by the number of rows ($n_Y$). For small images, the fixed time ($t_{INIT}$) to refocus the image for chromatic correction as well as other initialization procedures described previously per frequency become dominant resulting in diminishing improvements. Lastly, the imaging time is scaled by the number of discrete frequencies bands selected ($n_v$).

$$t_{FTIR} \propto n_C \left[ \frac{n_X n_Y}{n_{FPA}} t_{INT} (\Delta v^{-1}) \right] \quad \text{(Equation 1)}$$

$$t_{QCL} \propto n_v\left[n_Y t_{LINE}\left(n_X \Delta X, \frac{dX}{dt}, \frac{d^2X}{dt^2}, \frac{d^3X}{dt^3}\right) + t_{INIT}\right] \quad \text{(Equation 2)}$$

It is notable that high aspect ratios ($n_X/n_Y$) are more efficient for the scanning QCL system, whereas this value has no impact with the FT-IR system. The fast and slow axes (simplified as x and y respectively) do not need to align with the microscopy stage axes and an appropriate rotation of the sample can improve efficiency.

Figure 7A:
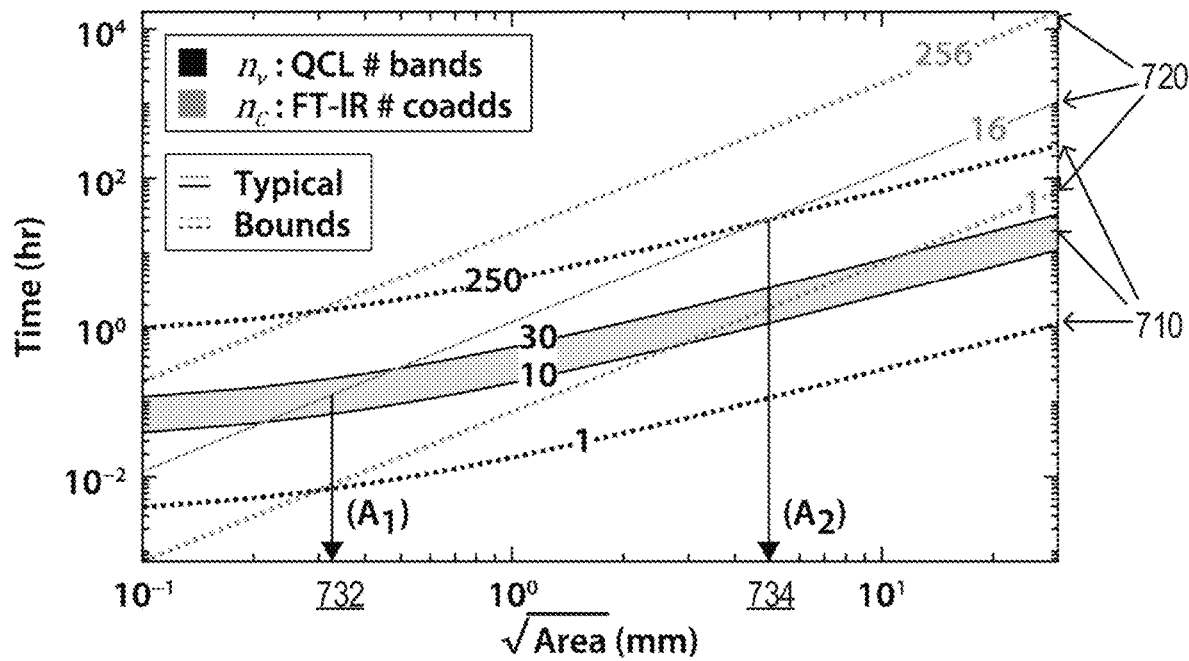
FIG. 7A shows a chart of estimated imaging time for a square sample area linearly scaled by the number of frequency bands or coadditions for an embodiment described in the present disclosure and a FT-IR system, respectively.

FIG. 7A shows a comparison of the performance of these two approaches as simulated, wherein 710 indicates QCL Imaging and 720 indicates FT-IR imaging. The most favorable scenario for the widefield systems is assumed, wherein square images are used from 0.1 µm up to 20 mm per side for comparisons. The minimum scan time for an image is given by a single QCL band or a single FT-IR coaddition. The upper bound is represented by hyperspectral QCL data with 250 bands at 4 cm$^{-1}$ spacing covering the fingerprint spectral region or 256 FT-IR coadditions which brings the SNR in line with that of the QCL. Under typical experimental parameters, between 10 to 30 QCL bands may be acquired as this information is typically what is required in DFIR approaches to obtain information about biological samples. Similarly, a typical parameter for FT-IR imaging systems may be 16 co-additions to achieve a reasonable SNR for tissue imaging, which is then augmented by post-processing noise reduction. Time required for this post-acquisition noise rejection is not included in the comparisons, though it may be substantial.

Based on the comparison of these systems and their current limits of performance, it may be demonstrated that no system is globally preferred in all scenarios. A particular system may be the preferred one depending on specific experimental conditions, and the following three scenarios may be described.

Case 1: Small samples below 300 µm. For an image the size of a single FOV, the FT-IR system may simply sweep the interferometer ($n_C t_{INT}$) whereas a scanning system may sweep the image line by line ($n_v n_y t_{LINE}$). While $n_C$ and $n_v$ may be reduced if appropriate, the inefficiency in turning the stage and re-scanning each line ($n_Y$) may make QCL scanning impractical. Thus, for small areas, it may be best to employ FT-IR imaging with a staring camera. The lower times to scan with the FT-IR system holds up to the crossover point ($A_1$, 732) shown in FIG. 7A. Under normal conditions, where a reasonable set of discrete frequency bands may be acquired, it may be preferable to perform this experiment using FT-IR at 16 coadditions or even 256 coadditions where the SNR between the systems is equivalent.

Case 2: Hyperspectral acquisition of samples up to 5 mm. The spectral multiplexing advantage of FT-IR interferometers remains up to moderately sized images ($A_2$, 734 in FIG. 7A). Both systems take roughly a day to image this area, however the QCL system is limited to the fingerprint spectral region. Here an experiment that draws no advantage from the ability of discrete band selection is assumed. This is often the case for completely unknown samples in which discovery of new information is targeted. Once prior information becomes available and the spectral set is reducible to smaller bandwidths, the speed advantage of DF-IR scanning grows to an order of magnitude.

Case 3: Large samples. The advantage of QCL DFIR systems is most significant when being used to screen large areas. For instance, 20 mm samples such as tissue surgical sections or microarrays, can be imaged in a day with a typical band set whereas this task would take an FT-IR system upwards of 1000 hours while still obtaining lower SNR. A means to quantitatively compare performance is to normalize ratings by noise (σ) and the number of pixels (n) required to cover a fixed area as follows.

$$R_{2:1} = \frac{n_2}{n_1}\frac{t_1}{t_2}\left(\frac{\sigma_1}{\sigma_2}\right)^2 \quad \text{(Equation 3)}$$

Figure 7B:
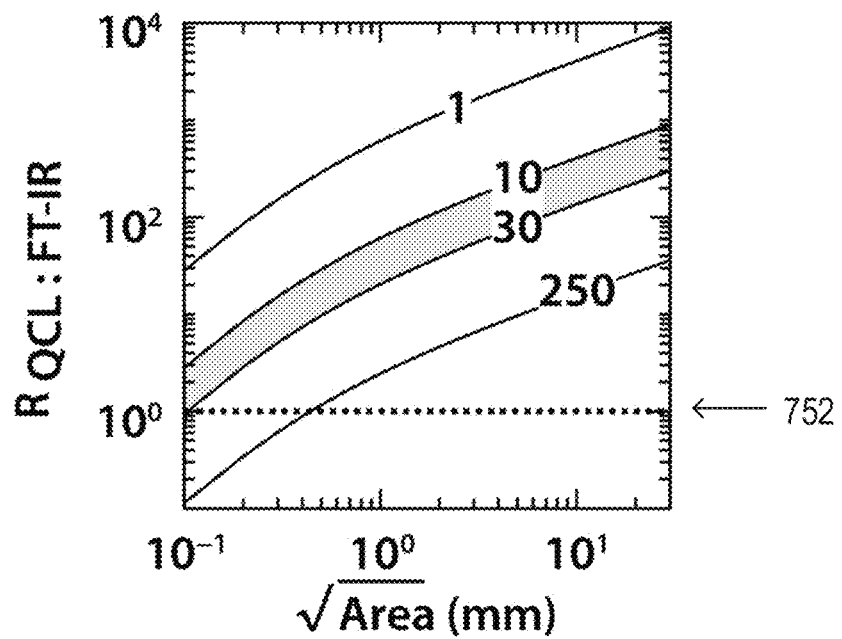
FIG. 7B shows a chart of SNR-normalized pixel rate ratio of an embodiment described in the present disclosure and a FT-IR system.

FIG. 7B shows relations where the QCL point scanning time is compared for different numbers of bands against FT-IR imaging with the dotted line 752 indicating parity. On a per pixel basis when SNR is equivalent, the FT-IR system may surpass the QCL system only when hyperspectral data is required, and even so only for small images. In all other cases, the QCL is faster and its advantage climbs rapidly as SNR required increases and/or spectral bands needed decrease. It is also instructive to compare the point scanning system against a widefield QCL based system previously reported using the same FPA detector as used in wide-field FT-IR imaging.

Figure 7C:
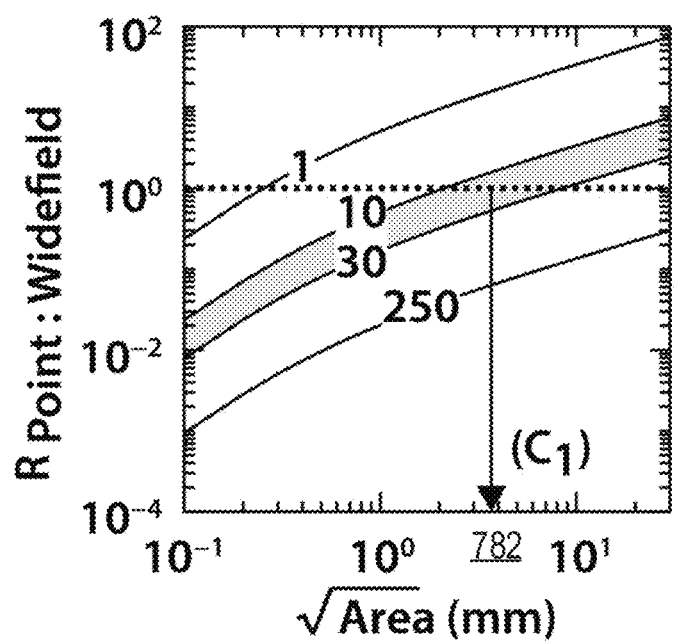
FIG. 7C shows a chart of SNR normalized pixel rate ratio of an embodiment described in the present disclosure and a QCL widefield imaging system.

FIG. 7C shows a performance comparison between a wide-field QCL DF-IR system and the point system, showing that t is evident that array detectors are faster up to mid-sized images ($C_1$, 782). These metrics, however, may not account for image quality where minimization of artifacts and aberrations allow for laser-based point scanning techniques to be dominant.

The comparison of wide-field and point DFIR systems demonstrates that the QCL point scanning, DFIR approach may be a candidate of choice for scanning large areas at limited spectral bands. The image quality may be further optimized and spectral acquisition may be further sped up. First, the image resolving performance of the designed system is evaluated against the state-of-the-art commercial FT-IR imaging system by measuring the contrast of an USAF 1951 resolution test target consisting of groups of progressively smaller features. The features of these negative chrome on glass targets broadly absorb IR frequencies while the background is highly reflective. These targets may allow to determine the resolution within the absorbance image across all spectral positions.

Figure 8A:
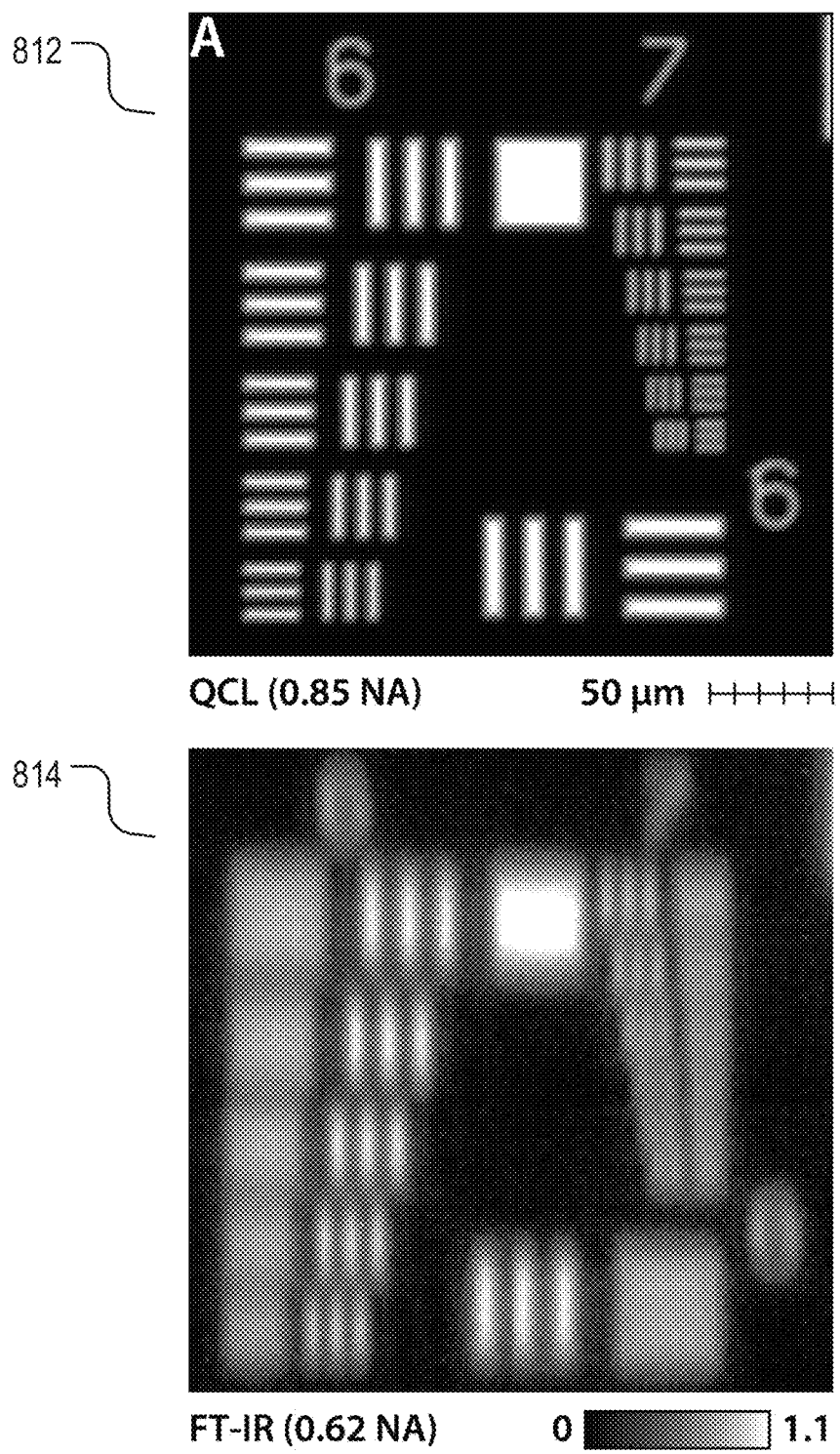
FIG. 8A shows absorbance images describing spatial resolution characteristics of an embodiment described in the present disclosure and a FT-IR imaging spectrometer.
Figure 8B:
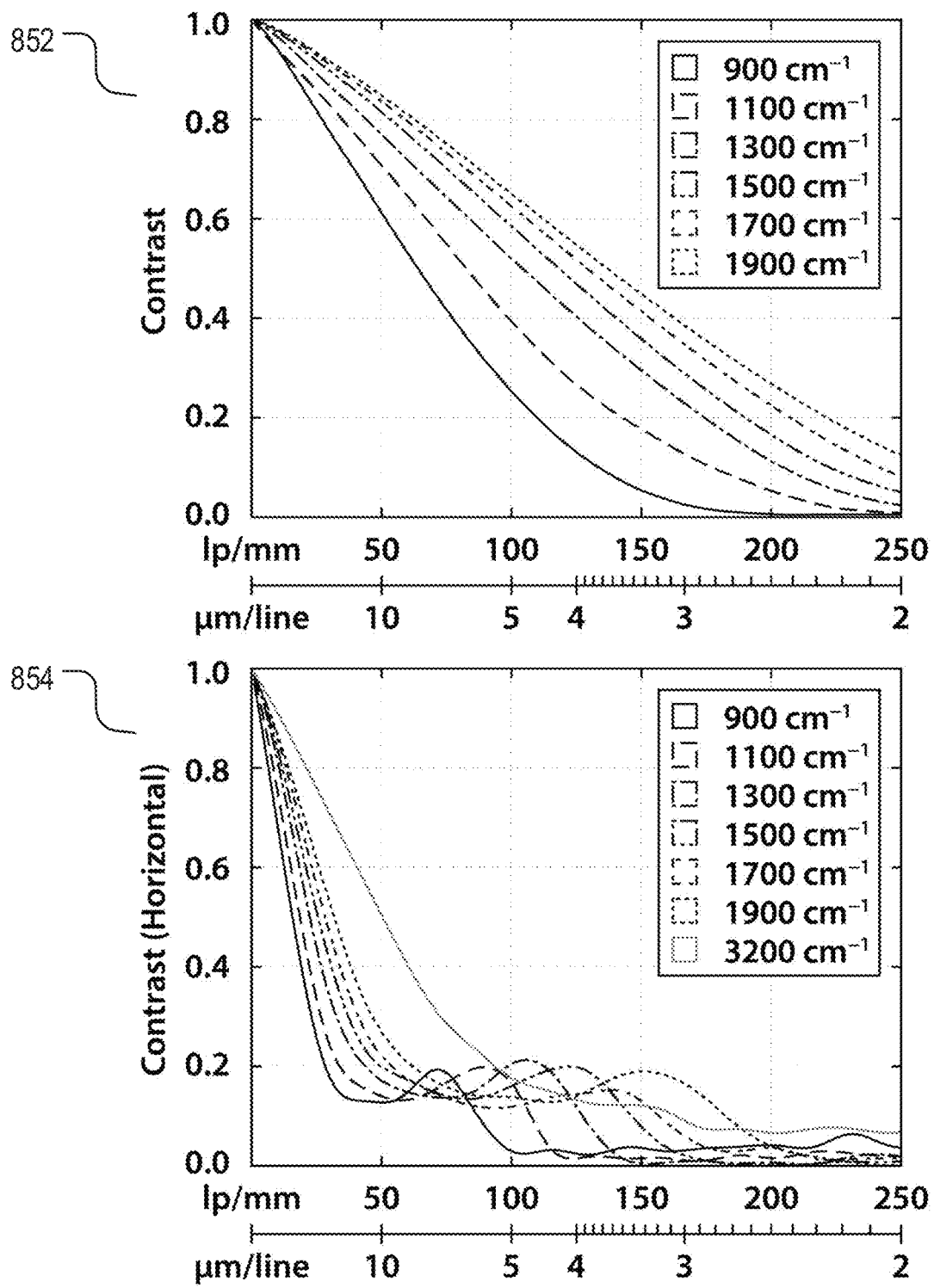
FIG. 8B shows charts of modulation transfer function (MTF) curves related to an embodiment described in the present disclosure.
Figure 8C:
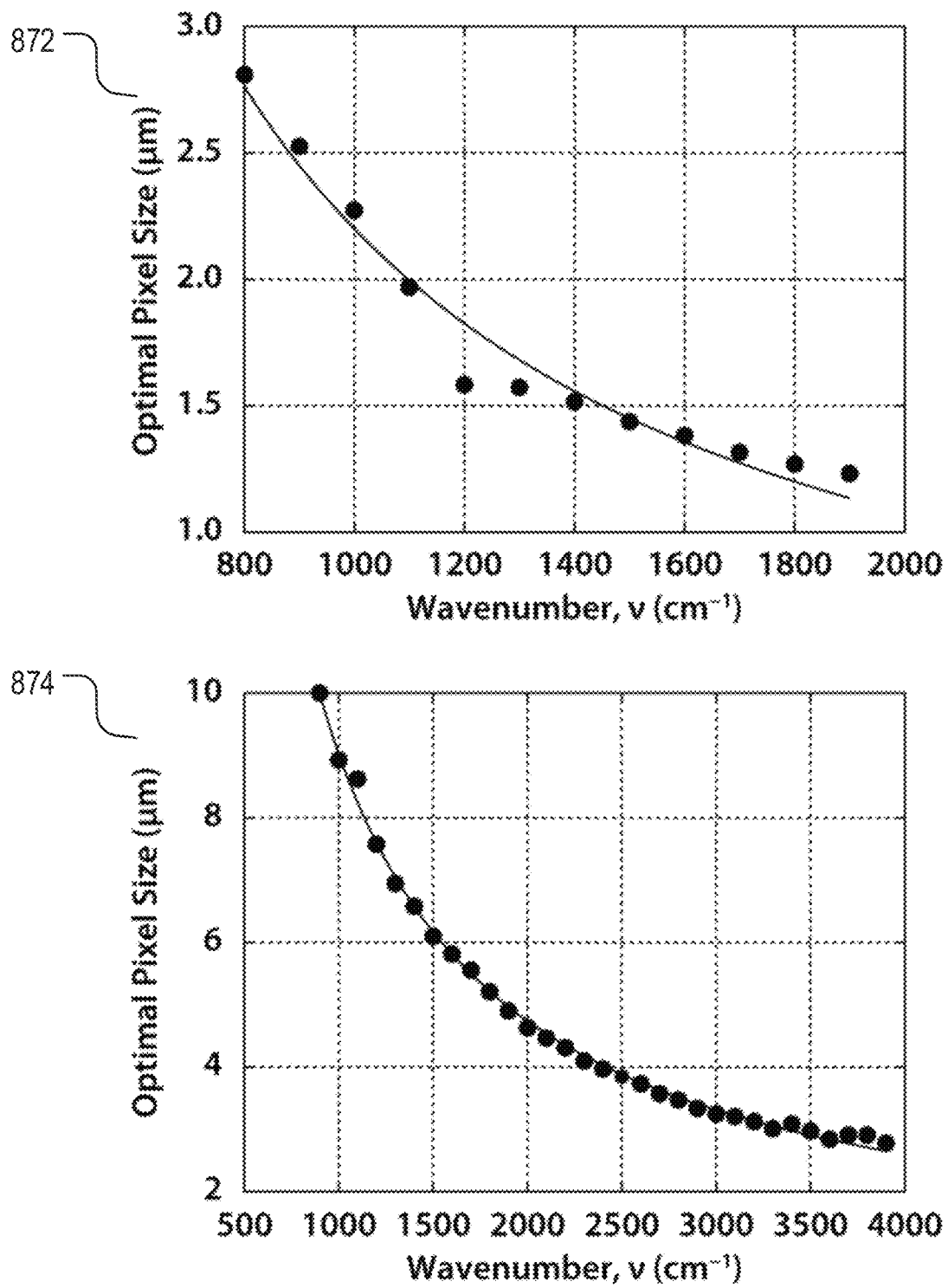
FIG. 8C shows charts of ideal pixel size measurements related to an embodiment described in the present disclosure.

Referring to FIG. 8A, it is observed that the resolving power of the QCL system (1 µm pixels) far exceeds that of a FTIR system (1.1 µm pixels), wherein 812 indicates a spatial resolution of a QCL microscope, and 814 indicates a spatial resolution of a FT-IR imaging spectrometer. FIG. 8A shows absorbance images of USAF 1951 chrome on glass negative resolution test target images of groups 6 and 7. FIG. 8B shows modulation transfer function (MTF) curves showing the reflectance contrast decay with increasing spatial frequency per wavenumber measured from a slant-edge. FIG. 8C shows ideal pixel size measurements per wavenumber with a fitted trendline.

Refractive optics focus all the light incident on the lens aperture to a single point. Since this is a stage-scanning system, the focal point is always on axis with minimal field-induced aberrations. The performance, which is proportional to wavenumber, is described by the modulation transfer function (MTF) curves that indicate how accurately a system reproduces contrast with increasing spatial frequency, see 852 in FIG. 8B. The use of refractive materials, however, has well-known drawbacks of not being able to simultaneously focus across a wide spectral range. Since the developed laser imaging spectrometer is a DF system, chromatic focal shifts are easily correctable mechanically, while losses due to attenuation of the material and limits of the anti-reflection coating are mitigated by higher source power.

None of these corrections are feasible with FT-IR systems; since the broad spectral range is simultaneously acquired, they are designed with reflective optics[34]. A reflective Schwarzschild objective focuses light without introducing chromatic aberrations using two reflective surfaces. Unlike a refractive singlet, these reflective objectives are corrected for third-order aberrations making them viable for wide-field imaging. However, there is a tradeoff between resolution and light throughput due to the large hole in the primary reflector. A larger obscuration allows for increased light throughput up to a limit but reduces the inner NA of the objective. This obscuration acts as a Fourier filter reducing the contrast of the lower spatial frequencies as evident by the stepped drop, see 854 in FIG. 8B.

Additionally, in epi-illumination configuration, a mirror may be rotated above the objective to direct the light to the sample and consequently blocks half of the light returning to the detector. Unlike a refractive beam splitter that evenly attenuates the beam but introduces other chromatic issues, the mirror completely blocks half the angular aperture but only in the vertical direction. The horizontal direction remains unaffected, thereby causing significant asymmetric blurring in the images. For trans-illuminated images, the vertical MTF may be expected to match the horizontal MTF.

From these MTF measurements, the optimal pixel size may be calculated as half the resolution where the contrast falls below the 26% specification of the Rayleigh criterion which is considered reasonable for common microscopy applications. Referring to FIG. 8C, the pixel size is inversely proportional to the wavenumber and often considered to be no larger than the highest utilized band to prevent aliasing by under-sampling. 872 indicates a pixel size of a QCL microscope, and 874 indicates a pixel size of a FT-IR imaging spectrometer.

Due to the large wavenumber range that spans the mid-infrared fingerprint region, considerable oversampling is inevitable. When pixel sizes are kept consistent, halving the wavenumber may result in 4-fold undersized pixels, increased scan times, and excess data processing requirements. Fourier transform systems especially have low data efficiency as they cannot decouple magnification from spectral information. Even camera-based discrete frequency systems cannot easily change magnification without additional optics. Only DF systems that employ point scanning for imaging formation allow for arbitrary pixel sizes that can be precisely adjusted to the optimal value for each wavenumber.

In one implementation, the pixel sampling may be triggered by the stage encoder to any multiple of encoder ticks which is spaced 50 nm. Instead of acquiring a data cube where each wavenumber slice has an equal number of pixels, this may be accelerated by avoiding over sampling and imaging the sample area always at appropriate resolution. Such an approach may need a careful interpolation of the data to ensure ease of data processing and assuring that spectral fidelity from each location is maintained as well as noting that the localized region from which each analytical result is derived changes with wavenumber. The same happens currently in any imaging system, of course, given the changing point spread function. FIG. 8C demonstrates that this varying pixel size is a possibility but also provides the optimal size, which may help optimize designs of the future that employ optimal spatial sampling to speed up data acquisition.

Exemplary Embodiment 2

Figure 9A:
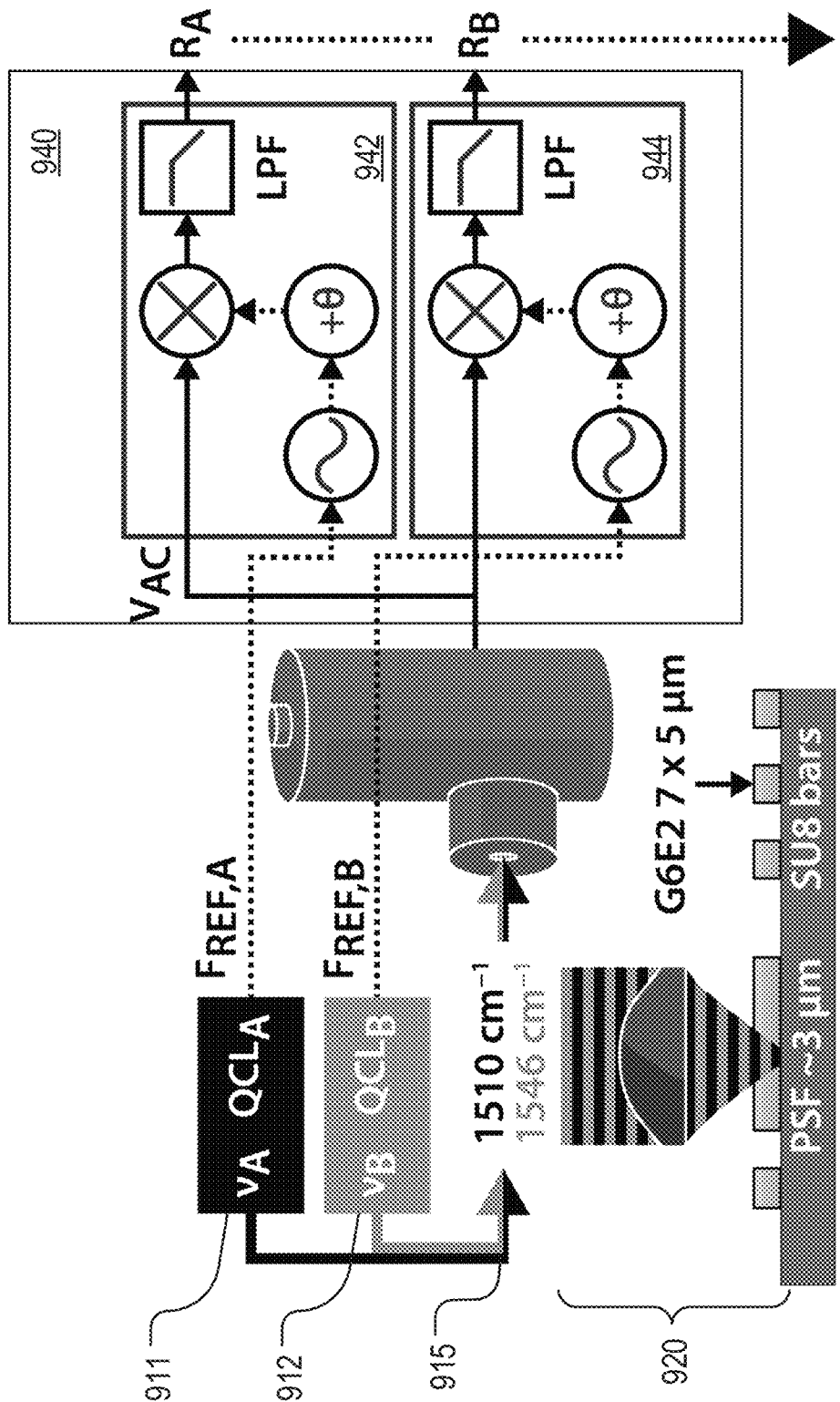
FIG. 9A shows a schematic of another exemplary embodiment of an apparatus for performing multi-color discrete frequency infrared spectroscopic imaging.

For another example but not limited to, FIG. 9A shows another embodiment of an apparatus/system that demodulates multiple incident beams to allow multiple spectral bands to be acquired simultaneously on a single detector. This approach may speed data collection by multiplexing. Some QCL imaging systems do not address the loss of spectral multiplexing inherently advantageous when using FT systems. In some systems, despite modern configurations commonly consisting of four individual QCL lasers per microscope to span the fingerprint region, only one laser may be transmitted at a time. In some systems, each discrete band in the set is measured sequentially while the other 3 lasers remain idle representing a clear inefficiency. IR detectors simply measure the intensity of irradiance without any information regarding the incident wavelength. Therefore, when using slower detectors that measure the average power of the laser, only one laser can be active at once. While it may be possible to use multiple detectors and a series of cutoff filters, such a system would have cross-talk relative to the quality factor of the filter and, therefore, have limited practicality.

Figure 9B:
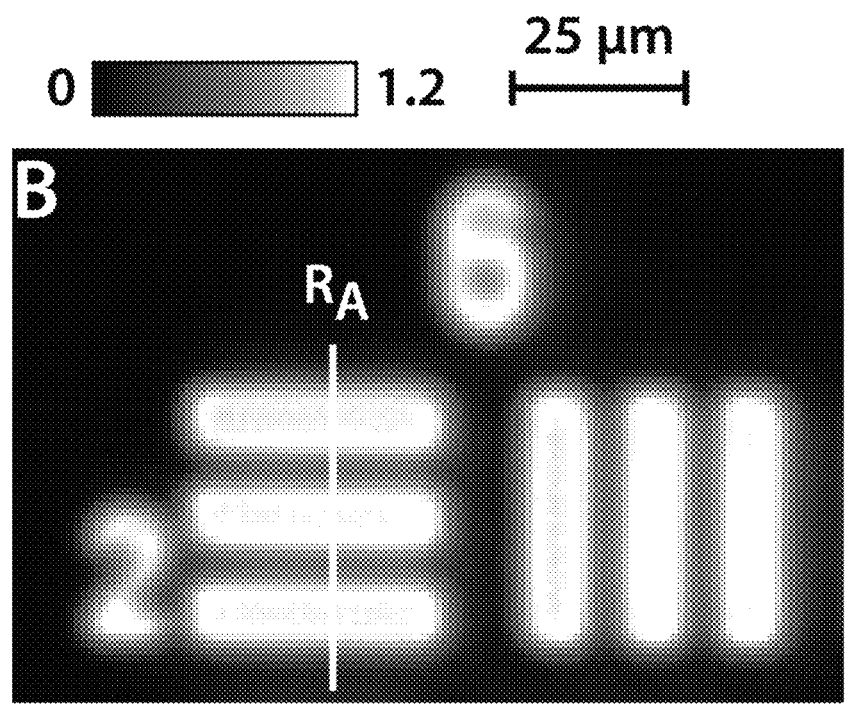
FIG. 9B shows an image of SU-8 photoresist bars on low-e reflective glass acquired at an absorbing wavenumber with an embodiment described in the present disclosure.
Figure 9C:
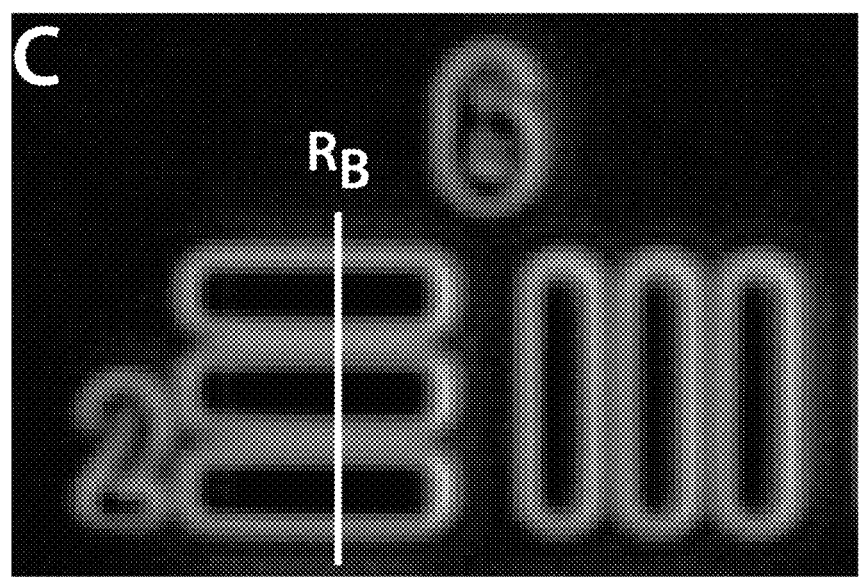
FIG. 9C shows an image of SU-8 photoresist bars on low-e reflective glass acquired at a non-absorbing wavenumber with an embodiment described in the present disclosure.
Figure 9D:
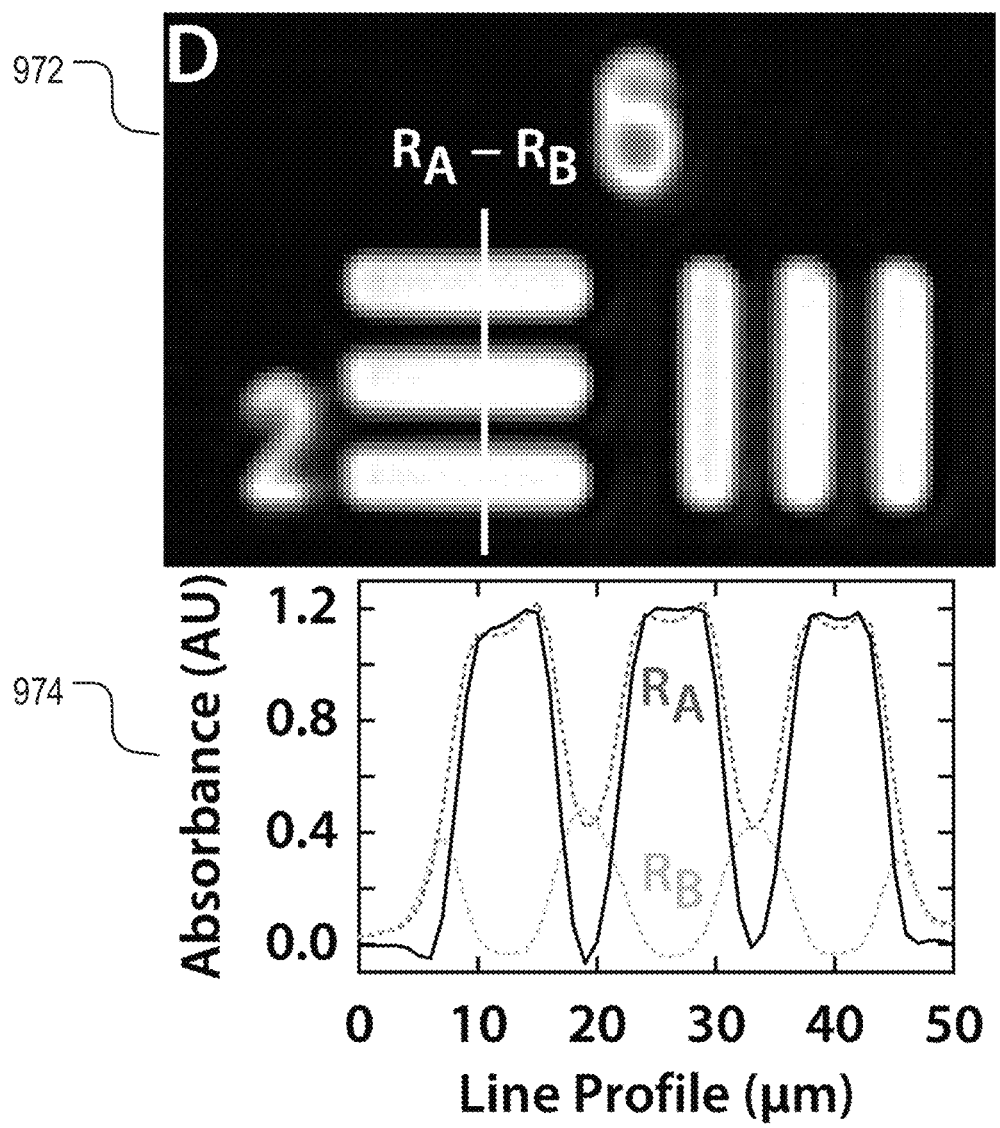
FIG. 9D shows a difference image and a chart of a line profile.

Referring to FIG. 9A, two essentially identical but separate laser assemblies (911 and 912) are collinearly aligned with a beam splitter. FIG. 9A shows a schematic of a DFIR microscope with a simultaneous multi-color acquisition scheme, wherein each color illuminates the sample with a unique repetition rate and the recorded signal is demodulated at the respective reference frequencies by a multi-channel lock-in amplifier. FIG. 9B shows SU-8 photoresist bars on low-e reflective glass acquired at an absorbing wavenumber. FIG. 9C shows SU-8 photoresist bars on low-e reflective glass acquired at a non-absorbing wavenumber. FIG. 9D shows a difference image that cancels scattering contributions resulting in a corrected absorbance image.

In one implementation, each of the laser assembly (911 and/or 912) may include 4 laser tuners. In another implementation, the two laser assemblies (911 and 912) may be replaced with a single laser system with completely independent tuners.

Referring to FIG. 9A, the combined laser beam 915 may be passed through the QCL microscope 920, similarly as described in FIG. 4A. The combined laser beam 915 include two or more laser beams at slightly different repetition rates. A digital lock-in amplifier 940 equipped with multiple demodulator units (942 and 944), each locked to respective reference frequencies, separate the signals from each laser. The embodiment may achieve a first consequence that the data acquisition is further sped up by a factor of 2. In another implementation, a similar approach may be adopted for even further multiplexing with emerging multi-color QCL lasers, for example, three or more different spectral frequencies.

While measuring multiple gas or liquid species has been shown to be possible, one unique application of multiplexing may be to actively remove scattering effects in the recorded data that arise from refractive index mismatches at domain boundaries. SU-8 photoresist bars that are 7 μm wide and 5 μm thick may be imaged. These are relatively small structures that are roughly the same size scale as the PSF. A key band set that is reduced from and representative of the full spectrum typically contains absorbing and baseline pairs that can be imaged simultaneously. When imaging the photoresist at an absorbing wavenumber (FIG. 9B), edge scattering is clearly visible and reduces the image contrast by approximately half according to the vertical line profile. At a non-absorbing wavenumber, which could be used for baseline correction in a continuous spectrum, only scattering-induced features are present in the attenuated beam. These are well-known to arise from refractive index mismatches at boundaries (FIG. 9C). Using the dual color system here, the differential signal 972 may be recorded (FIG. 9D), which is the scattering corrected absorbance normally used for analysis. The line profile 974 in FIG. 9D shows that the edge scattering contributions are clearly observed and duly subtracted in real time.

In one implementation, the precise wavenumbers for absorption bands and non-absorbing spectral regions can be quickly determined for any sample using the rapid scanning spectrometer described in FIG. 5A. Simultaneous multi-color imaging, while common across other microscopy modalities, may be broadly implemented for mid-infrared discrete frequency micro-spectroscopy. When 4-tuner QCL laser systems that are truly independent become available, no additional design changes may be expected to pair with lock-in amplifiers including 4 demodulators. As development of multi-channel QCL chips consisting of larger arrays become more prevalent, this may exceed capabilities feasible with lock-in amplifiers. Nevertheless, the ability to compress large numbers of frequency bands into a single receiver is well known in the telecom industry and many of these techniques may be implemented in iterations of discrete frequency microscopy systems as IR laser technology continues to advance.

The present disclosure describes and characterizes various embodiment for a DFIR point scanning spectrometer and compares it to state-of-the-art commercial FT-IR spectroscopic imaging systems. The separation of magnification from optics or sensors, and arbitrarily controllable by software, allows to optimize imaging parameters to prevent oversampling, minimize scan times, and reduce data overhead. Consequently, the performance of the system may exceed that of previous QCL imaging or mapping systems as well as some leading FT-IR imaging systems. The present disclosure demonstrates the experimental parameter space where the performance of the DFIR system may exceed that of FT-IR wide-field imaging whereas the spectral quality exceeds that of any point or wide-field FT-IR imaging spectrometer. The present disclosure also shows marked improvements in spatial image quality with the new optical design. More advancement though multi-color mapping demonstrates potential to provide corrected absorbance images or multiplexed chemical information. These extensions in performance may exceed current state of the art in both spectral and spatial data quality and provide exciting new opportunities for advancing IR imaging technology.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. A method for obtaining a discrete frequency infrared (DFIR) spectroscopic image for a sample, the method comprising:
  generating, by a first laser source, a first pulsed laser beam comprising a first spectral frequency in a mid-IR region and a first pulse repetition rate;
  transmitting, by a first group of optical components, the first pulsed laser beam onto a first location of a sample;
  collecting, by a second group of optical components, first optical signal at the first spectral frequency emitting from the first location of the sample onto a detector to obtain first raw electric signal;
  demodulating, by a first demodulator based on the first pulse repetition rate, the first raw electric signal to obtain a first intensity value corresponding to the first location of the sample; and
  determining, by a control device comprising a memory storing instructions and a processor in communication with the memory and based on the first intensity value, a first pixel value corresponding to the first spectral frequency in a DFIR spectroscopic image corresponding to the first location of the sample.

2. The method according to claim 1, further comprising:
  generating, by a second laser source, a second pulsed laser beam comprising a second spectral frequency in the mid-IR region and the first pulse repetition rate;
  transmitting, by the first group of optical components, the second pulsed laser beam onto the first location of the sample;
  collecting, by the second group of optical components, second optical signal emitting from the first location of the sample onto the detector to obtain second raw electric signal;
  demodulating, by the first demodulator based on the first pulse repetition rate, the second raw electric signal to obtain a second intensity value corresponding to the first location of the sample; and
  determining, by the control device and based on the second intensity value, a second pixel value corresponding to the second spectral frequency in the DFIR spectroscopic image corresponding to the first location of the sample,
  wherein:
    the first spectral frequency and the second spectral frequency are different, and
    the first pulsed laser beam and the second pulsed laser beam are transmitted onto the first location of the sample in a sequential manner.

3. The method according to claim 1, further comprising:
  generating, by a second laser source, a second pulsed laser beam comprising a second spectral frequency in the mid-IR region and a second pulse repetition rate;
  transmitting, by the first group of optical components, the second pulsed laser beam onto the first location of the sample;
  collecting, by the second group of optical components, second optical signal emitting from the first location of the sample onto the detector to obtain second raw electric signal;
  demodulating, by a second demodulator based on the second pulse repetition rate, the second raw electric signal to obtain a second intensity value corresponding to the first location of the sample; and determining, by the control device and based on the second intensity value, a second pixel value corresponding to the second spectral frequency in the DFIR spectroscopic image corresponding to the first location of the sample, wherein:
the first spectral frequency and the second spectral frequency are different,
the first pulse repetition rate and the second pulse repetition rate are different, and
the first pulsed laser beam and the second pulsed laser beam are transmitted onto the first location of the sample simultaneously.

4. The method according to claim 1, further comprising:
determining, by the control device, a plurality of pixel values corresponding to the first spectral frequency of the DFIR spectroscopic image based on a plurality of intensity values for a plurality of locations of the sample by at least one of the following:
sweeping, by a movable stage holding the sample, the sample relative to the first pulsed laser beam; or
steering, by at least one rotatable mirror in the first group of optical components, the first pulsed laser beam on the sample.

5. The method according to claim 4, wherein:
the movable stage is in a sweeping motion following a third order trajectory so that the sample is moved in a s-curve.

6. The method according to claim 5, wherein:
the sweeping motion is along a long axis of a field of interest (FOI) on the sample.

7. The method according to claim 1, wherein:
the first laser source comprises at least one of the following:
a quantum cascade laser (QCL);
an optical parametric oscillator (OPO); or
an interband cascade laser (ICL).

8. The method according to claim 1, wherein:
the detector comprises at least one of the following:
a mercury cadmium telluride (MCT) detector;
an uncooled bolometer; or
a visible detector in conjunction with a visible laser.

9. The method according to claim 1, wherein:
the first group of optical components comprises rotatable mirrors to adjust a pointing angle of the first pulsed laser beam;
the first pulsed laser beam is transmitted onto the sample in a epi-illumination mode; and
the first group of optical components and the second group of optical components comprises at least one common optical component.

10. The method according to claim 1, wherein:
a lock-in amplifier comprises the first demodulator to demodulate the first raw electric signal from background to obtain the first intensity value based on the first pulse repetition rate.

11. An apparatus for obtaining a discrete frequency infrared (DFIR) spectroscopic image for a sample, the apparatus comprising:
a first laser sources configured to generate a first pulsed laser beam comprising a first spectral frequency in a mid-IR region and a first pulse repetition rate;
a first group of optical components configured to transmit the first pulsed laser beam onto a first location of a sample;

a second group of optical components configured to collect first optical signal at the first spectral frequency emitting from the first location of the sample onto a detector to obtain first raw electric signal;
a first demodulator configured to demodulate, based on the first pulse repetition rate, the first raw electric signal to obtain a first intensity value corresponding to the first location of the sample; and
a control device configured to determine, based on the first intensity value, a first pixel value corresponding to the first spectral frequency in a DFIR spectroscopic image corresponding to the first location of the sample.

12. The apparatus according to claim 11, further comprising:
a second laser source configured to generate a second pulsed laser beam comprising a second spectral frequency in the mid-IR region and the first pulse repetition rate, wherein:
the first group of optical components is configured to transmit the second pulsed laser beam onto the first location of the sample;
the second group of optical components is configured to collect second optical signal emitting from the first location of the sample onto the detector to obtain second raw electric signal;
the first demodulator is configured to demodulate, based on the first pulse repetition rate, the second raw electric signal to obtain a second intensity value corresponding to the first location of the sample;
the control device is configured to determine, based on the second intensity value, a second pixel value corresponding to the second spectral frequency in the DFIR spectroscopic image corresponding to the first location of the sample;
the first spectral frequency and the second spectral frequency are different; and
the first pulsed laser beam and the second pulsed laser beam are transmitted onto the first location of the sample in a sequential manner.

13. The apparatus according to claim 11, further comprising:
a second laser source is configured to generate a second pulsed laser beam comprising a second spectral frequency in the mid-IR region and a second pulse repetition rate, wherein:
the first group of optical components is configured to transmit the second pulsed laser beam onto the first location of the sample;
the second group of optical components is configured to collect second optical signal emitting from the first location of the sample onto the detector to obtain second raw electric signal;
a second demodulator is configured to demodulate, based on the second pulse repetition rate, the second raw electric signal to obtain a second intensity value corresponding to the first location of the sample;
the control device is configured to determine, based on the second intensity value, a second pixel value corresponding to the second spectral frequency in the DFIR spectroscopic image corresponding to the first location of the sample;
the first spectral frequency and the second spectral frequency are different;

the first pulse repetition rate and the second pulse repetition rate are different; and the first pulsed laser beam and the second pulsed laser beam are transmitted onto the first location of the sample simultaneously.

14. The apparatus according to claim 11, wherein:

the control device is further configured to determine a plurality of pixel values corresponding to the first spectral frequency of the DFIR spectroscopic image based on a plurality of intensity values for a plurality of locations of the sample by at least one of the following:

sweeping, by a movable stage holding the sample, the sample relative to the first pulsed laser beam; or steering, by at least one rotatable mirror in the first group of optical components, the first pulsed laser beam on the sample.

15. The apparatus according to claim 14, wherein:

the movable stage is in a sweeping motion following a third order trajectory so that the sample is moved in a s-curve.

16. The apparatus according to claim 15, wherein:

the sweeping motion is along a long axis of a field of interest (FOI) on the sample.

17. The apparatus according to claim 11, wherein:

the first laser source comprises at least one of the following:
- a quantum cascade laser (QCL);
- an optical parametric oscillator (OPO); or
- an interband cascade laser (ICL).

18. The apparatus according to claim 11, wherein:

the detector comprises at least one of the following:
- a mercury cadmium telluride (MCT) detector;
- an uncooled bolometer; or
- a visible detector in conjunction with a visible laser.

19. The apparatus according to claim 11, wherein:

the first group of optical components comprises rotatable mirrors to adjust a pointing angle of the first pulsed laser beam;

the first pulsed laser beam is transmitted onto the sample in a epi-illumination mode; and the first group of optical components and the second group of optical components comprises at least one common optical component.

20. The apparatus according to claim 11, wherein:

a lock-in amplifier comprises the first demodulator to demodulate the first raw electric signal from background to obtain the first intensity value based on the first pulse repetition rate.

* * * * *